United States Patent [19]

Itoh

[11] Patent Number: 5,500,701
[45] Date of Patent: Mar. 19, 1996

[54] DATA RECORDING MODULE DEVICE FOR CAMERA AND CAMERA SYSTEM USING THE SAME

[75] Inventor: Junichi Itoh, Tokyo, Japan

[73] Assignee: Olympus Optical Co., Ltd., Tokyo, Japan

[21] Appl. No.: 142,855

[22] Filed: Oct. 25, 1993

[30] Foreign Application Priority Data

Oct. 26, 1992 [JP] Japan .................................. 4-287829

[51] Int. Cl.$^6$ ................................................ C03B 17/24
[52] U.S. Cl. ................................................ 354/106
[58] Field of Search ........................... 354/21, 105, 106, 354/173.11

[56] References Cited

U.S. PATENT DOCUMENTS

| | | | |
|---|---|---|---|
| 4,499,805 | 5/1984 | Sakurada et al. | 354/105 |
| 4,728,978 | 3/1988 | Inoue et al. | 354/289.1 |
| 4,814,802 | 3/1989 | Ogawa | 354/105 |
| 4,825,233 | 4/1989 | Kanai et al. | 354/106 |
| 4,853,733 | 8/1989 | Watanabe et al. | 354/412 |
| 4,958,174 | 9/1990 | Goto et al. | 354/106 |
| 4,987,439 | 1/1991 | Cloutier | 354/105 |
| 5,005,031 | 4/1991 | Kelbe | 354/106 |
| 5,036,344 | 7/1991 | Inoue et al. | 354/106 |
| 5,089,833 | 2/1992 | Takahashi et al. | 354/105 |
| 5,101,225 | 3/1992 | Wash et al. | 354/106 |
| 5,103,250 | 4/1992 | Arifuku et al. | 354/106 |
| 5,119,119 | 6/1992 | Amano et al. | 354/106 |
| 5,194,892 | 3/1993 | Robison | 354/106 |
| 5,227,823 | 7/1993 | Shigaki | 354/106 |
| 5,287,136 | 2/1994 | Kitagawa et al. | 354/173.1 |
| 5,294,949 | 3/1994 | Robison et al. | 354/106 |
| 5,307,100 | 4/1994 | Kubo | 354/106 |

FOREIGN PATENT DOCUMENTS

| | | |
|---|---|---|
| 0433019 | 6/1991 | European Pat. Off. . |
| 4128827 | 4/1992 | Japan . |
| 4-125533 | 4/1992 | Japan . |

*Primary Examiner*—Michael L. Gellner
*Assistant Examiner*—Nicholas J. Tuccillo
*Attorney, Agent, or Firm*—Frishauf, Holtz, Goodman, Langer & Chick

[57] ABSTRACT

In a data recording module device for a camera and a camera system using the same according to this invention, a detachable module is mounted on a camera body, and a function of recording data on a magnetic track is provided for the module, thereby allowing a data recording operation without adding new components to the camera. A body microcomputer is incorporated in the camera body. A film feed section drives a film having a magnetic track in accordance with a command from the body microcomputer. A module microcomputer is mounted in the module which is detachable with respect to the camera body. An EEPROM for storing data and a data recording circuit are connected to the module microcomputer. A magnetic head for recording data on the magnetic track on the film is connected to the data recording circuit.

13 Claims, 28 Drawing Sheets

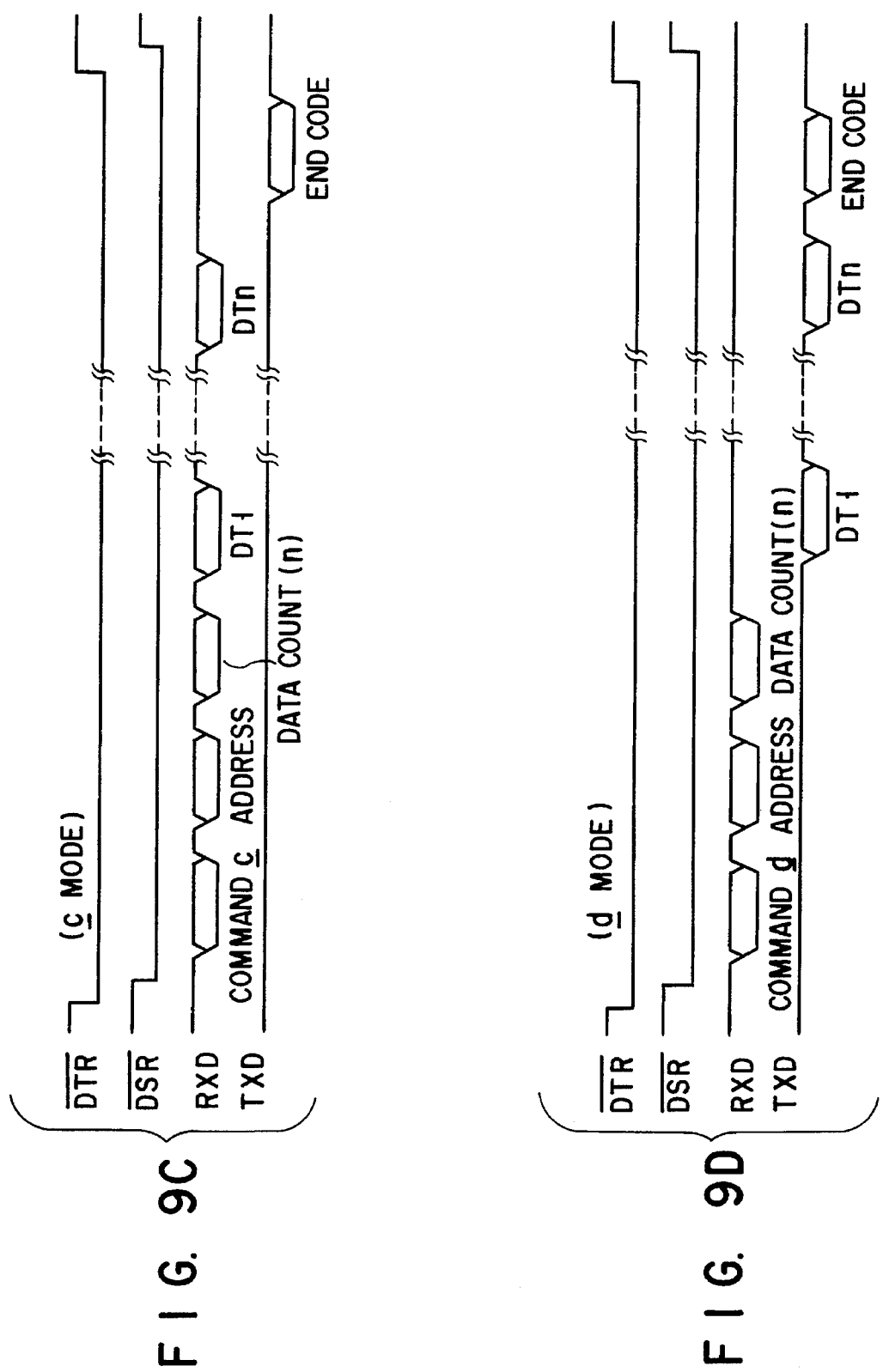

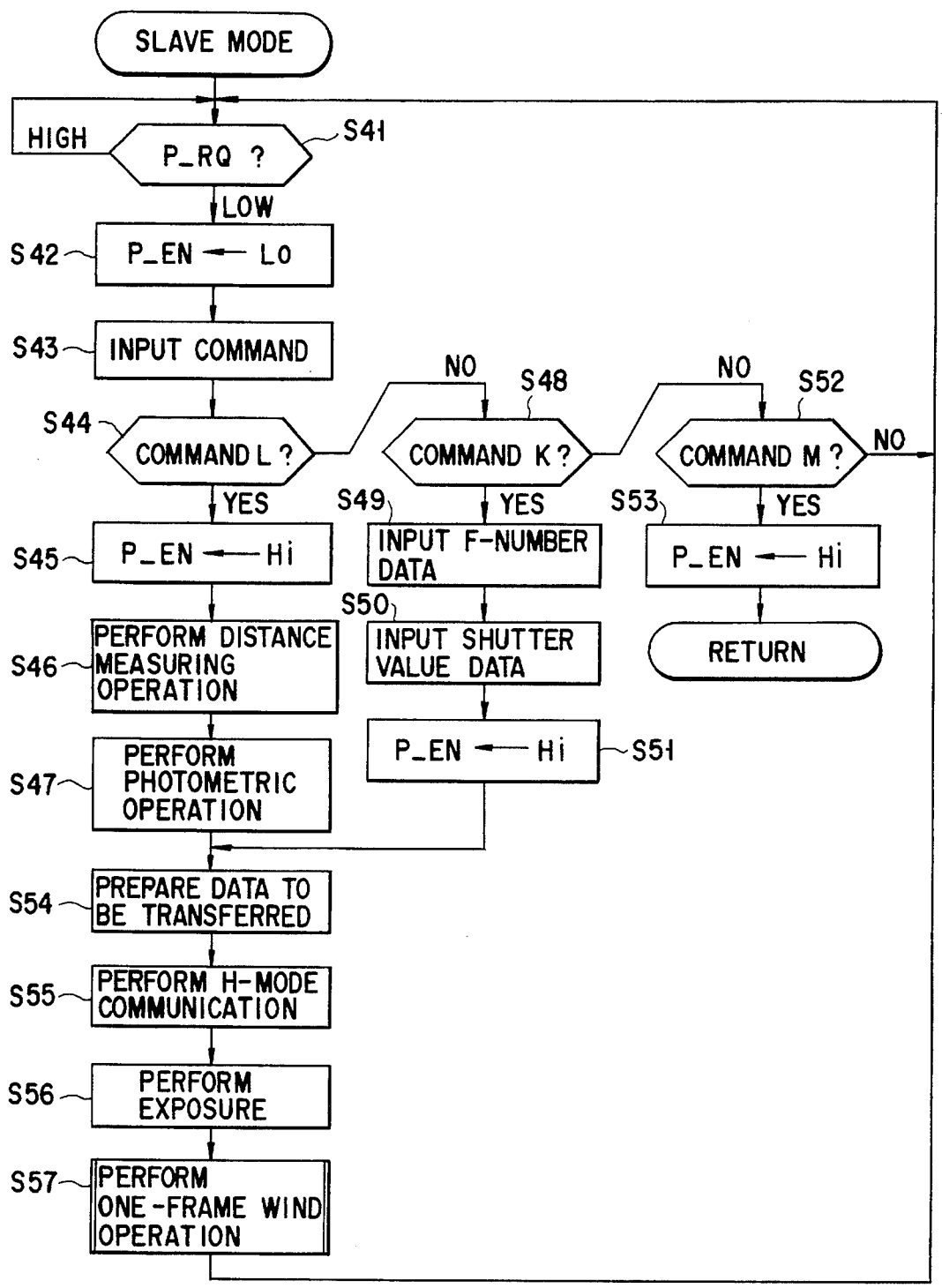
F I G. 11

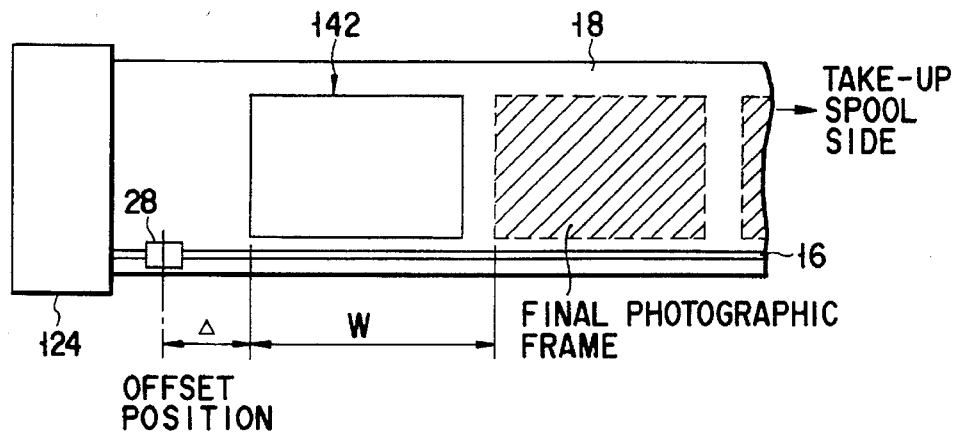
F I G. 15A
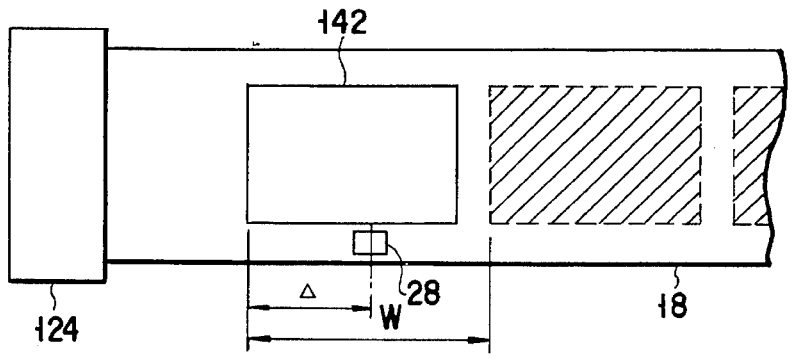
F I G. 15B
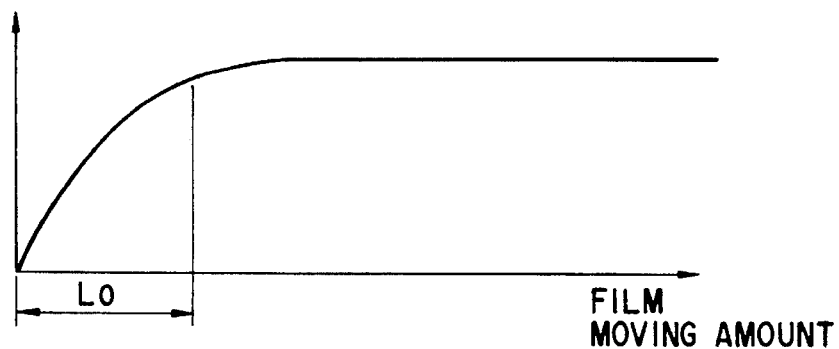
F I G. 16

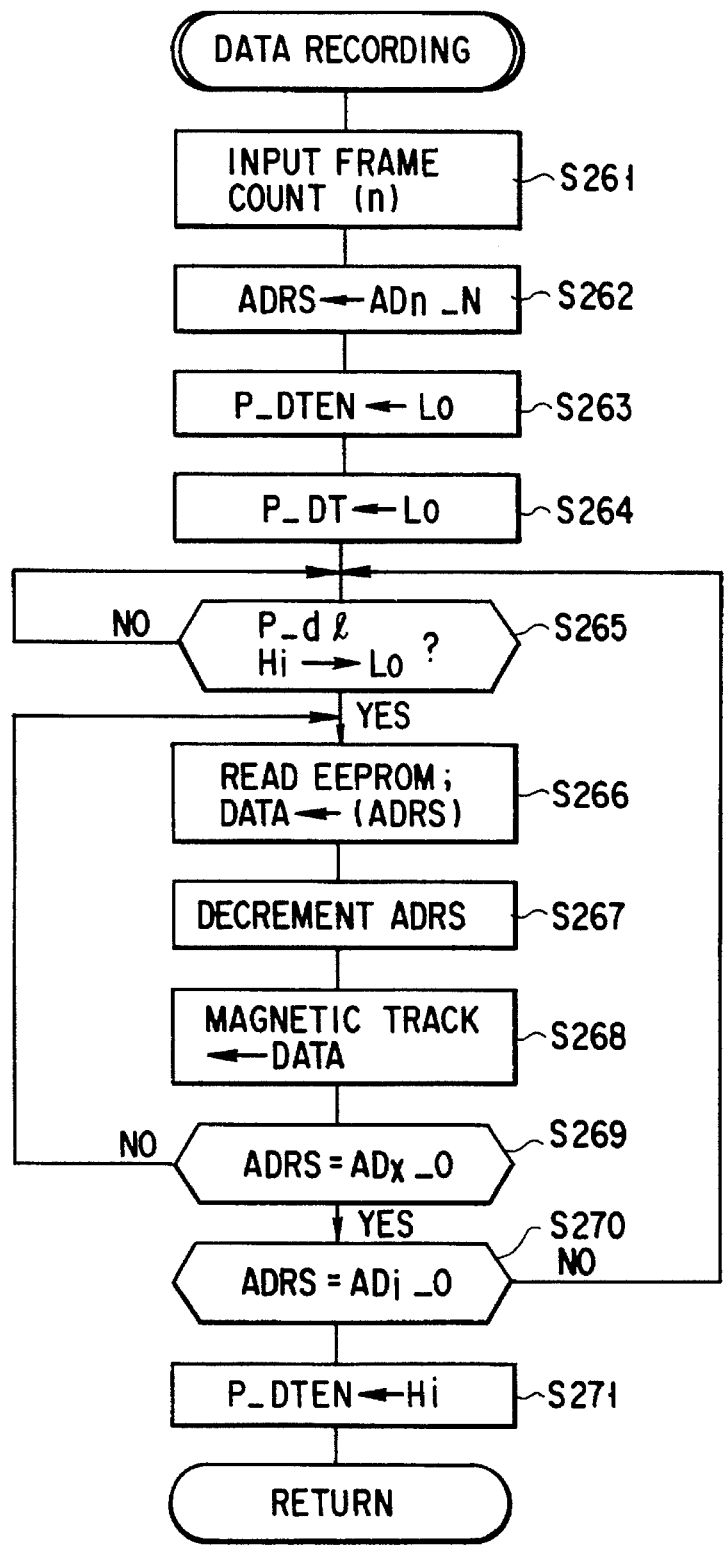
F I G. 21

ANSI (ASCII)

|   | 0 | 1 | 2 | 3 | 4 | 5 | 6 | 7 |
|---|---|---|---|---|---|---|---|---|
| 0 | NUL | TC7 (DLE) | SP | 0 | @ | P | ` | p |
| 1 | TC1 (SOH) | DC1 | ! | 1 | A | Q | a | q |
| 2 | TC2 (EXT) | DC2 | " | 2 | B | R | b | r |
| 3 | TC3 (EOT) | DC3 | # | 3 | C | S | c | s |
| 4 | TC4 (EOT) | DC4 | $ | 4 | D | T | d | t |
| 5 | TC5 (ENQ) | TC8 (NAK) | % | 5 | E | U | e | u |
| 6 | TC6 (ACK) | TC9 (SYN) | & | 6 | F | V | f | v |
| 7 | BEL | TC10 (ETB) | ' | 7 | G | W | g | w |
| 8 | FE0 (BS) | CAN | ( | 8 | H | X | h | x |
| 9 | FE1 (HT) | EM | ) | 9 | I | Y | i | y |
| A | FE2 (LF) | SUB | * | : | J | Z | j | z |
| B | FE3 (VT) | ESC | + | ; | K | [ | k | { |
| C | FE4 (FF) | IS4 (FS) | , | < | L | \ | l | \| |
| D | FE5 (CR) | IS3 (CS) | - | = | M | ] | m | } |
| E | SO | IS2 (RS) | . | > | N | ^ | n | ~ |
| F | S1 | IS1 (US) | / | ? | O | _ | o | DEL |

F I G. 27

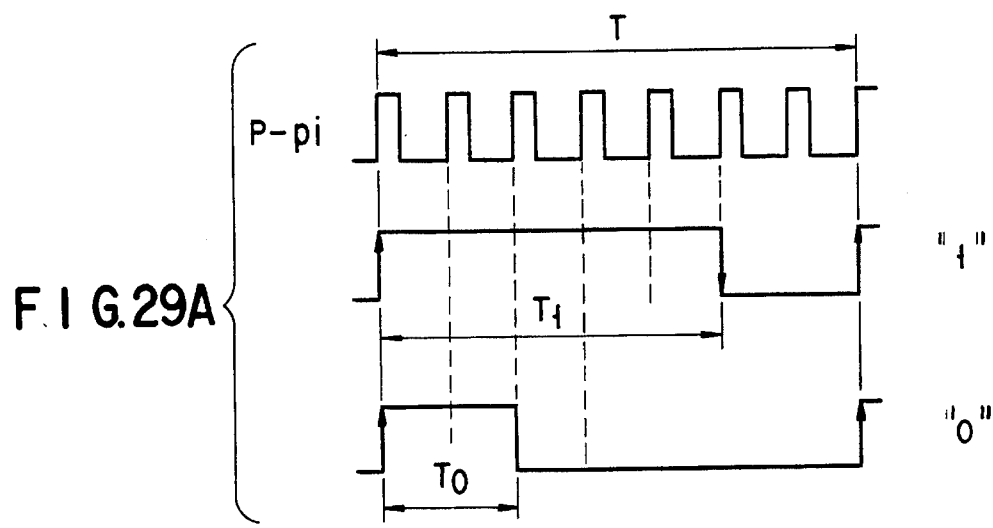
F I G. 29A
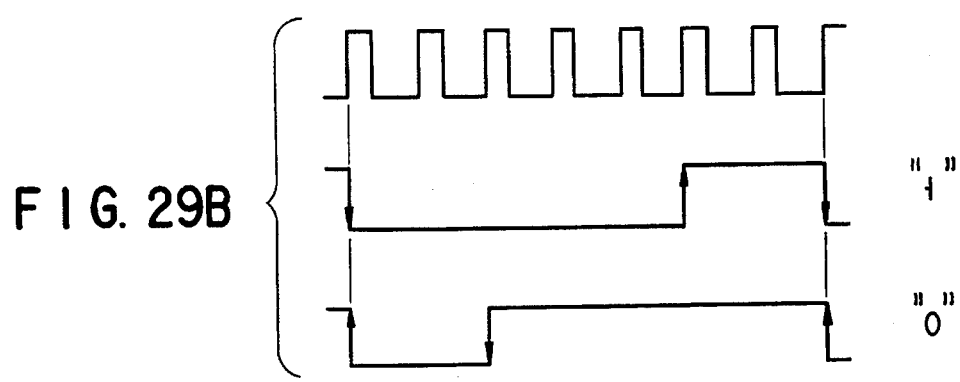
F I G. 29B
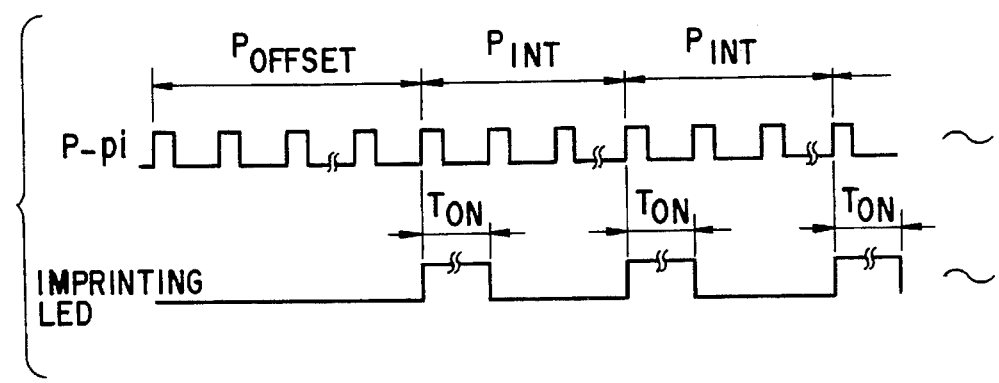
F I G. 31

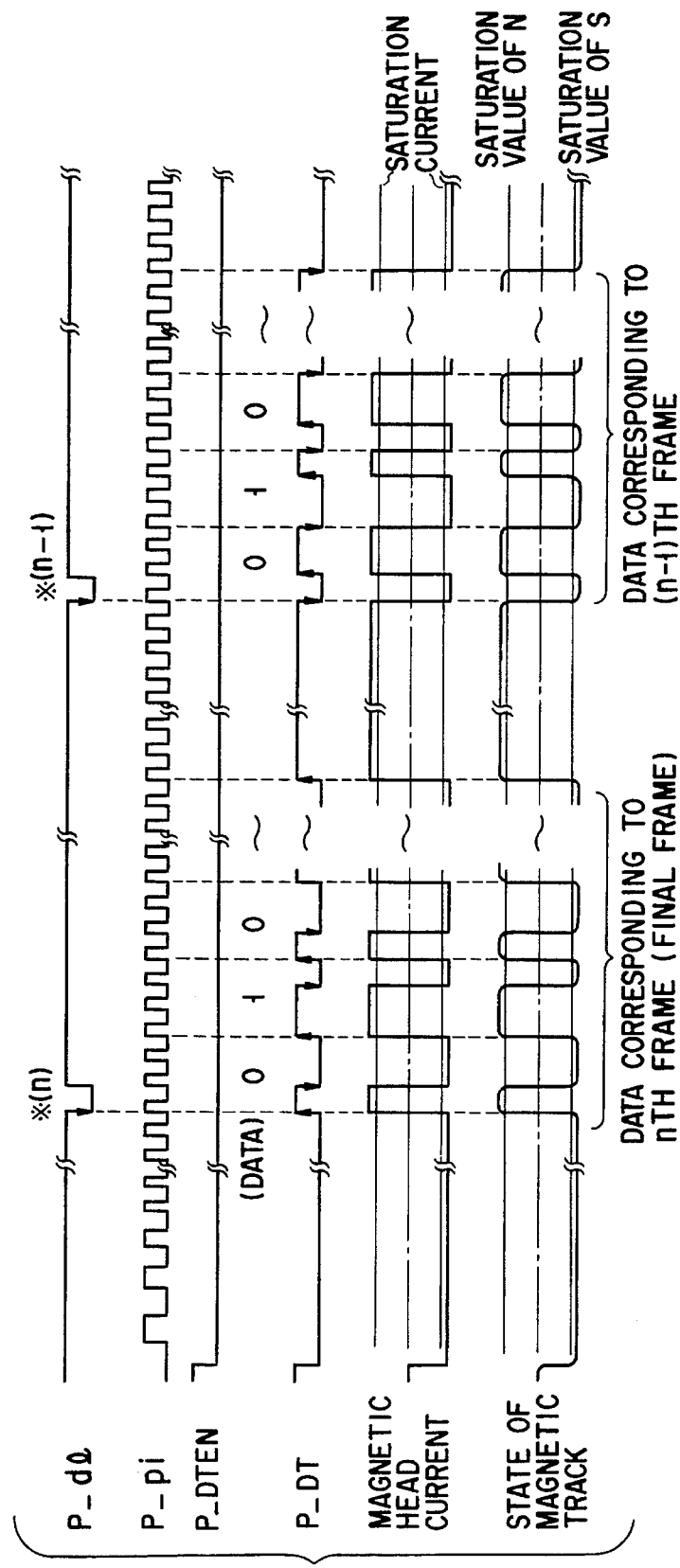
F I G. 30

DATA RECORDING MODULE DEVICE FOR CAMERA AND CAMERA SYSTEM USING THE SAME

BACKGROUND OF THE INVENTION

1. Field of the Invention

The present invention relates to a data recording module device for a camera and, more particularly, to a data recording module device used for a camera and designed to record various data by using a film having a magnetic recording medium, and a camera system using the same.

2. Description of the Related Art

Conventionally, data such as a photographic environment and the like have been recorded on a portion of a film. For example, various data are recorded on a magnetic track formed on a film to allow imprinting or the like of data.

In addition to imprinting of date data on photographs, this technique allows retention of memorandum data associated with the photographic environments of necessary films of all the films that have undergone development. Furthermore, if data are recorded on portions of films, the films can be easily arranged in order, and a film which meets the requirement of a customer can be easily retrieved from a plurality of films.

since various data can be recorded, in large quantities, on magnetic tracks formed on films as described above, the application range of cameras is greatly expanded.

Recording of data on magnetic tracks, however, requires new parts which have not existed in conventional cameras, e.g., a recording circuit, a magnetic head, and a magnetic head driving member. These new parts are unnecessary for a user who does not need to record such data. In addition, the addition of the new parts leads to an increase in cost of a camera itself. That is, the user who does not need to record data must also suffer the demerit of the increase in cost.

SUMMARY OF THE INVENTION

It is, therefore, an object of the present invention to provide a data recording module device for a camera, which can record various types of data in large quantities, and does not require a user who does not need to record data to add new parts for data recording, thereby preventing an unnecessary increase in cost of the camera itself.

In order to achieve the above object, according to the present invention, there is provided a camera system comprising a camera body allowing a film having a magnetic recording medium to be loaded therein, and a rear cover having a data recording module for recording data on the magnetic recording medium, the rear cover being detachable with respect to the camera body, the camera body including film feed means for feeding the film, data preparing means for preparing data to be recorded on the magnetic recording medium, transfer means for transferring the data to the data recording module, feed control means for controlling the film feed means to execute a film feed operation, and signal supply means for supplying a start signal to the data recording module in synchronism with the film feed operation, thereby causing the data recording module to start a magnetic recording operation, and the data recording module including reception means for receiving data transferred from the transfer means, storage means for storing the received data, and magnetic recording means for reading out the data stored in the storage means in response to the recording operation start signal, and magnetically recording the readout data on the magnetic recording medium.

According to the present invention, there is provided a camera system comprising a camera body including a first microcomputer incorporated in the camera body, the microcomputer being capable of transmitting data to the outside of the camera body, and a film feed mechanism controlled by the first microcomputer to feed a film loaded in the camera body, and a rear cover module detachable with respect to the camera body and including a second microcomputer incorporated in the rear cover module, a storage unit for storing the data, transmitted from the first microcomputer, in accordance with a control command from the second microcomputer, a magnetic recording head for magnetically recording data on a magnetic recording portion formed on the film, and a magnetic recording circuit for reading out the data stored in the storage unit in accordance with a control signal from the second microcomputer, and recording the data on the magnetic recording portion.

In addition, according to the present invention, there is provided a camera system comprising a camera body having camera-side connector means for externally transmitting data, and a module device having module-side connector means, detachably mounted on the camera body, for receiving external data, the camera body including filter feed means for feeding a film loaded in the camera body, film movement signal generating means for generating a pulse signal in accordance with movement of the film driven by the film feed means, and means for outputting data associated with control of the camera body through the camera-side connector means, and the module device including magnetic head means for performing a magnetic recording operation with respect to a magnetic recording portion on the film, and control means for causing the magnetic head means to record the data received through the connector means on the magnetic recording portion at a timing corresponding to the pulse signal.

Furthermore, according to the present invention, there is provided a module device capable of externally transmitting data and detachable with respect to a camera body, comprising control means for receiving the data from the camera body and performing sequence control of the module device, and magnetic head means for recording the data on a magnetic recording portion on a film loaded in the camera body in accordance with a control signal from the control means.

Moreover, according to the present invention, there is provided a data recording unit used for a camera to record various data on a photosensitive film having a magnetic recording medium and loaded in the camera, the data recording unit including optical recording means for optically recording at least part of the data on a photosensitive portion of the film, and magnetic recording means for magnetically recording at least part of the data on the magnetic recording medium on the film.

In the data recording module device for a camera according to the present invention, the detachable module is mounted on the camera body, and the function of recording data on a magnetic track is provided for the module. When the module is mounted on the camera body, processing required for a data recording operation is performed by communication with the module. A user who does not need to record data mounts a normal module, which is not designed for data recording, on the camera body. With this arrangement, the cost of a camera increases only for a user who needs to record data, but the increase in cost of the camera itself can be suppressed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 8A through 8G are timing charts of communicating operations in the respective modes, in which FIG. 8A is the timing chart in the A- to F-modes, FIG. 8B is the timing chart in the G-mode, FIG. 8C is the timing chart in the H-mode, FIG. 8D is the timing chart in the I-mode, FIG. 8E is the timing chart in the J-mode, FIG. 8F is the timing mode in the K-mode, and FIG. 8G is the timing chart in the L- and M-modes;

FIGS. 9A through 9D are timing charts for explaining a communication protocol between the personal computer and the module microcomputer, in which FIG. 9A is the timing chart in the a mode, FIG. 9B is the timing chart in the b mode, FIG. 9C is the timing chart in the c mode, and FIG. 9D is the timing chart in the d mode;

FIG. 11 is a flow chart showing a subroutine for explaining the operation of a "slave mode";

FIGS. 15A and 15B are views for explaining why the processing in steps S89 to S91 in the subroutine shown in FIG. 13 is performed;

FIG. 16 is a graph showing changes in film moving speed immediately after a film wind operation is started;

FIG. 21 is a flow chart showing a subroutine for explaining a "data recording" operation;

FIG. 27 is a table showing ASCII codes;

FIGS. 29A and 29B are timing charts for explaining a data recording operation;

FIG. 30 is a timing chart for explaining a data recording operation; and

FIG. 31 is a timing chart expressing the operation of the subroutine "imprinting".

DETAILED DESCRIPTION OF THE PREFERRED EMBODIMENTS

Embodiments of the present invention will be described below with reference to the accompanying drawings.

Figure 1:
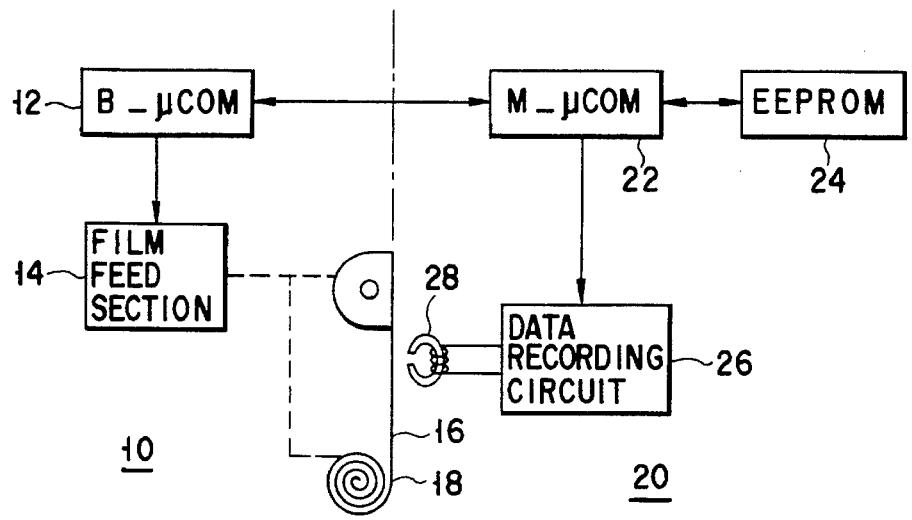
FIG. 1 is a block diagram showing the schematic arrangement of a data recording module device for a camera according to the present invention.

FIG. 1 is a block diagram showing the schematic arrangement of a data recording module device for a camera according to the present invention.

Referring to FIG. 1, a body microcomputer (B_μCOM) 12 is incorporated in a camera body 10. A film feed section 14 drives a film 18 having a magnetic track 16 in accordance with a command from the body microcomputer 12. On the module 20 side, a module microcomputer (M_μCOM) 22 is mounted. An EEPROM 24 for storing data and a data recording circuit 26 are connected to the module microcomputer 22. A magnetic head 28 for recording data on the magnetic track 16 of the film 18 is connected to the data recording circuit 26.

In this arrangement, the body microcomputer 12 on the camera body 10 side transfers data to the module 20 side through a communication line to record it on the magnetic track 16 of the film 18. The module microcomputer 22 then causes the EEPROM 24 to temporarily store the data transferred from the body microcomputer 12.

The body microcomputer 12 issues a command to the film feed section 14 to rewind the film 18, and outputs a recording operation start command to the module microcomputer 22 in synchronism with the film rewind operation of the film feed section 14. Upon reception of the recording operation start command, the module microcomputer 22 reads out the data from the EEPROM 24 and outputs it to the data recording circuit 26. The read data is recorded on the magnetic track 16 of the film 18 by the magnetic head 28.

An embodiment of this data recording module device of the present invention will be described next.

Figure 2:
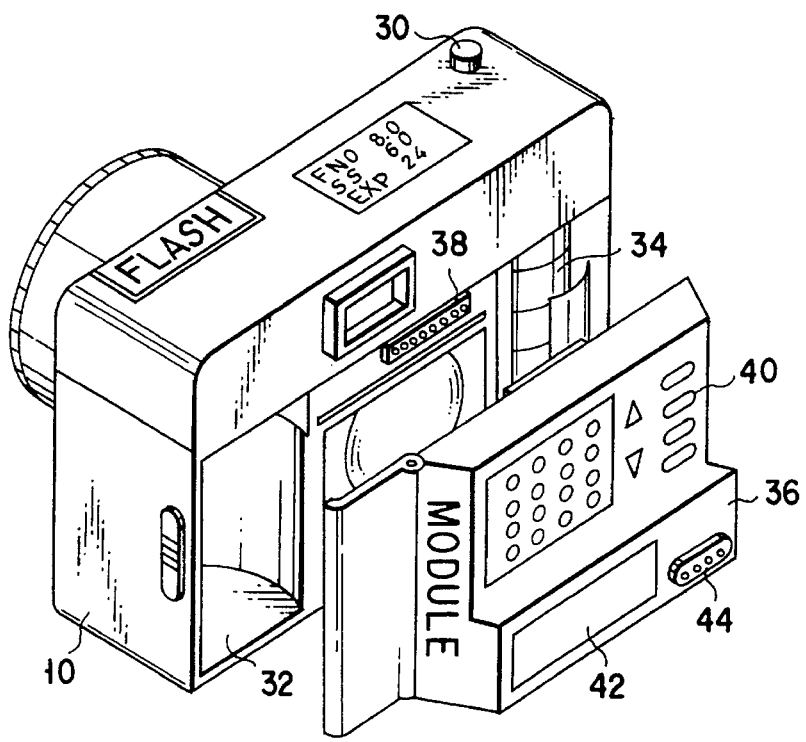
FIG. 2 is a perspective view showing a camera system to which the data recording module device of the present invention is applied.

FIG. 2 is a perspective view showing a camera system to which the data recording module device of the present invention is applied. A release switch 30 is arranged on the upper portion of the camera body 10. A film cartridge housing chamber 32, a take-up spool 34, and a connector 38 are arranged at the rear surface portion of the camera body 10. The film cartridge housing chamber 32 houses a film cartridge. The take-up spool 34 serves to take up a loaded film. The connector 38 serves to communicate with a rear cover module 36 (to be described later).

The rear cover module 36 is detachable with respect to the camera body 10. The rear cover module 36 includes various types of operation switches 40 for data recording, a display section 42 for displaying data, and the connector 44 for allowing communication with a personal computer or the like arranged outside the camera.

The rear cover module 36 is electrically connected to the camera body 10 through the connector 38. In accordance with commands from the camera body 10, the rear cover module 36 performs a date data imprinting operation with respect to a film and a data recording operation with respect to a magnetic track.

Figure 3:
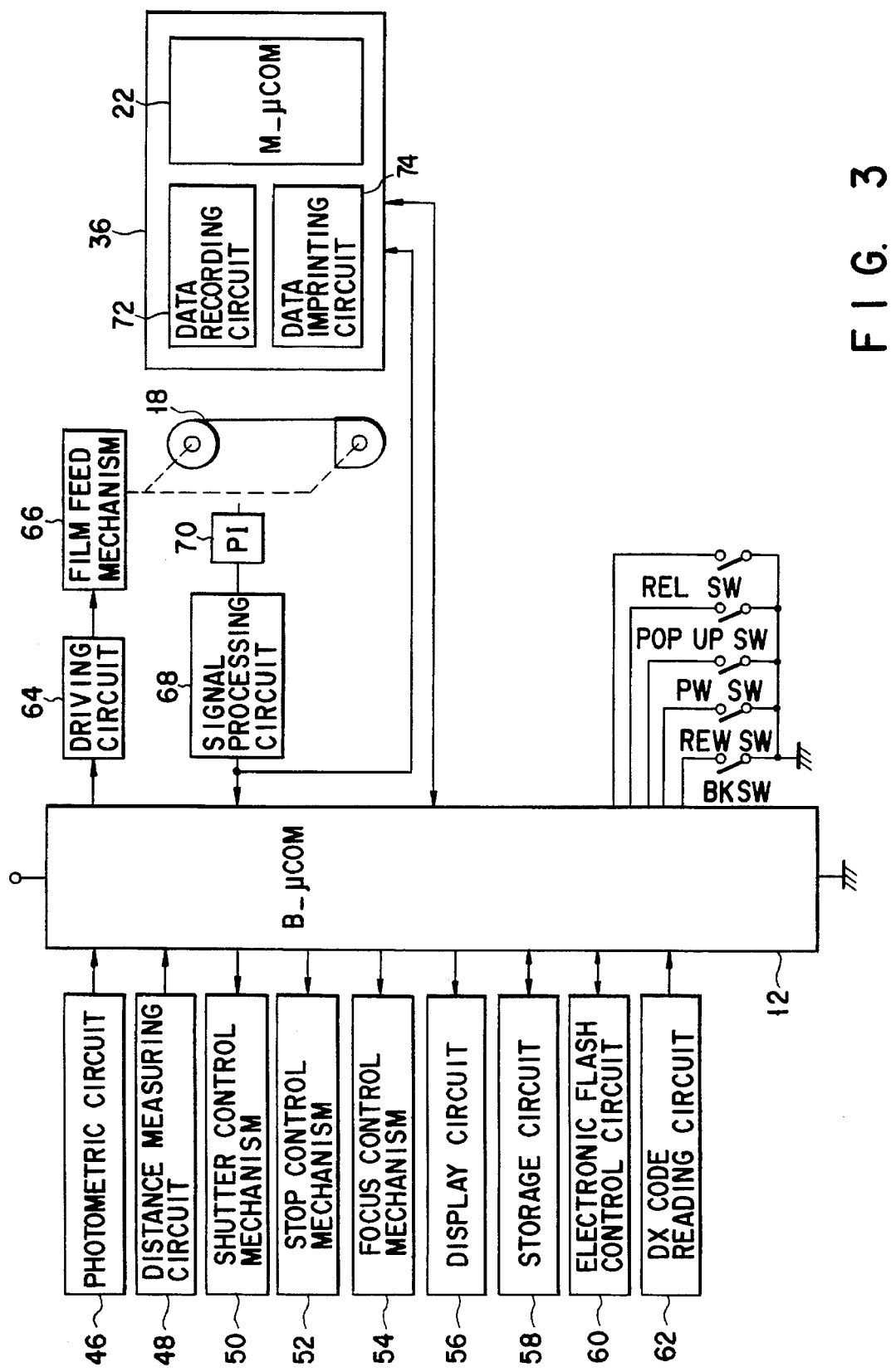
FIG. 3 is a block diagram showing the overall camera system in FIG. 2.

FIG. 3 is a block diagram showing the overall camera system in the embodiment. The body microcomputer 12 is a microcomputer for performing overall control of the camera body. The following known components are connected to the body microcomputer 12: a photometric circuit 46, a distance measuring circuit 48, a shutter control mechanism 50, a stop control mechanism 52, and a focus control mechanism 54.

A display circuit 56 displays a photographic frame count, exposure conditions, and the like in accordance with a command from the body microcomputer 12. A storage circuit 58 serves to store photographic frame count data, camera adjustment data, and the like. The storage circuit 58 is constituted by a nonvolatile memory such as an EEPROM. An electronic flash control circuit 60 performs electric charge control of a main capacitor (not shown) and emission control of a Xe (Xenon) tube in accordance with commands from the body microcomputer 12. A DX-code reading circuit 62 reads out the film speed and photographic frame count data of the film 18.

A driving circuit 64 controls a motor for driving a film feed mechanism 66 in accordance with a command from the body microcomputer 12, thus winding/rewinding the film 18. A signal processing circuit 68 converts a signal, generated by a photointerrupter (PI) 70 in synchronism with the movement of the film 18, into a pulse signal.

As described above, the rear cover module 36 is detachable with respect to the camera body 10. The module microcomputer 22 is a microcomputer for controlling the rear cover module 36. A data recording circuit 72 serves to record data on the magnetic track formed on the film 18. The data imprinting circuit 74 serves to optically record date data on the film 18.

A rear cover switch (BK SW) is a switch which is turned on when the rear cover is open. By detecting a change in state of the rear cover switch (from an ON state to an OFF state), the body microcomputer 12 recognizes that a film cartridge is loaded. A power switch (PW SW) is a switch which is interlocked with the power supply of the camera. A pop-up switch (POP UP SW) is a switch which is operated when an electronic flash unit is used. A release switch (REL SW) (30) is a switch which starts an exposure operation. A rewind switch (REW SW) is a halfway rewind switch. When this switch is operated, the exposed film 18 is housed in the film cartridge.

Figure 4:
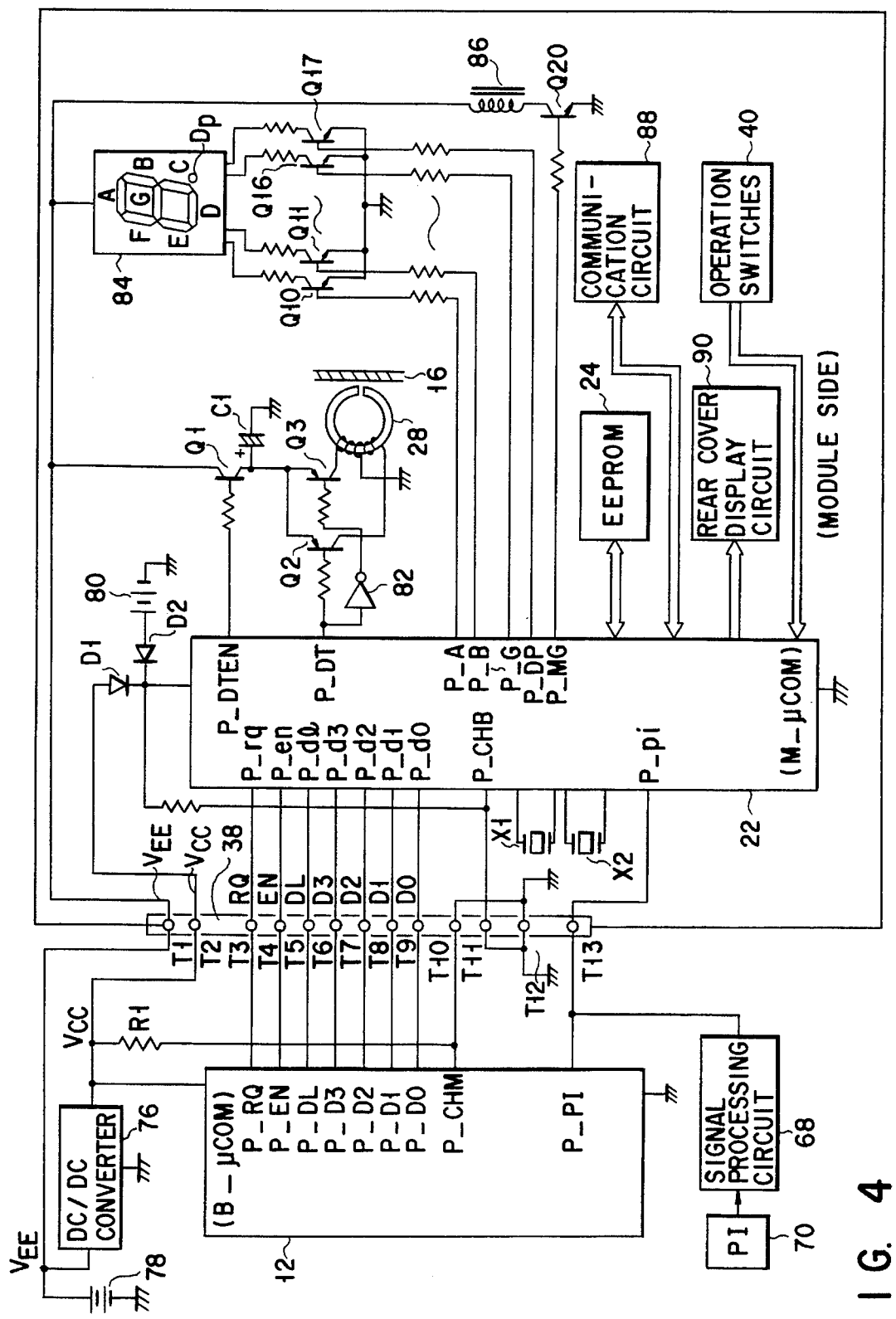
FIG. 4 is a block diagram showing the arrangement of a rear cover module, and control lines between a body microcomputer (B microcomputer) and a module microcomputer (M microcomputer)

FIG. 4 shows the arrangement of the rear cover module 36 and control lines between the body microcomputer 12 and the module microcomputer 22. The communication lines of the two microcomputers are connected to each other through the connector 38. In this case, the connector 38 has 13 terminals. A battery voltage ($V_{EE}$) from the camera body 10 is output to a terminal T1. An output voltage ($V_{CC}$) from a DC/DC converter 76 is output to a terminal T2. Terminals T3 to T9 are used for communication between the body microcomputer 12 and the module microcomputer 22. A communication request signal is output to RQ of the terminal T3. A communication enable signal is output to EN of the terminal T4. A data latch signal is output to DL of the terminal T5. Data are output to D3 to D0 of the terminals T6 to T9. A method of communication between the body microcomputer 12 and the module microcomputer 22 will be described later.

The body microcomputer 12 checks on the basis of a terminal T10 whether the rear cover module 36 is mounted on the camera body 10. The terminal T10 is connected to P_CHM of the body microcomputer 12. The terminal T10 is connected to the GND line on the rear cover module 36 side and is also connected to the $V_{CC}$ line on the camera body 10 side through a resistor R1. Therefore, while the rear cover module 36 is mounted on the camera body 10, P_CHM is at low level (Lo). Otherwise, P_CHM is at high level (Hi).

The module microcomputer 22 can check on the basis of a terminal T11 whether the rear cover module 36 is mounted on the camera body 10. When the rear cover module 36 is mounted on the camera body 10, the terminal T11 is connected to GND. As a result, P_CHB of the module microcomputer 22 is set at low level. A terminal T12 is used to connect GND.

A pulse signal output from the signal processing circuit 68 is supplied to the module microcomputer 22 through a terminal T13. This pulse signal is generated in accordance with the movement of the film 18. The body microcomputer 12 receives the pulse signal through P_PI to detect a film driving amount. The module microcomputer 22 receives this signal through P_pi. In synchronism with this signal, the module microcomputer 22 executes a data imprinting operation with respect to the film 18 and a data recording operation with respect to the magnetic track 16.

Power to the module microcomputer 22 is supplied from a power supply 78 through the DC/DC converter 76 of the camera body 10 and from a backup battery 80. Diodes D1 and D2 serve to prevent interference between the two power supplies. While the DC/DC converter 76 of the camera body 10 is in operation, power from the DC/DC converter 76 is supplied to the module microcomputer 22. When the power switch is turned off, and the DC/DC converter 76 is stopped, power is supplied from the backup battery 80 to the module microcomputer 22. The operation of the module microcomputer 22 cannot be stopped because of its timepiece function. Therefore, the backup battery 80 is required.

An oscillator X1 generates a clock signal for the timepiece function. The module microcomputer 22 counts this clock signal to generate data to be imprinted, i.e., "YEAR", "MONTH", "DAY", "HOUR", and "MINUTE" data. An oscillator X2 generates a clock signal faster than that generated by the oscillator X1. When power is supplied from the DC/DC converter 76, the clock signal generated by the oscillator X2 is used as an operation clock signal for the module microcomputer 22.

As described above, the magnetic head 28 is used to record data on the magnetic track 16 on the film 18. A data recording operation can be performed when a transistor Q1 is ON. The transistor Q1 is controlled by an output port P_DTEN of the module microcomputer 22. Data to be recorded is converted into serial data and is output from P_DT. When P_DT is at low level, a transistor Q2 is turned on, and a current flows in the magnetic head 28, thus magnetizing a magnetic member in a predetermined direction. When P_DT is at high level, an inverter 82 turns on a transistor Q3. As a result, the direction of magnetization of the magnetic member is reversed. Therefore, the data is recorded on the magnetic member by outputting the data to P_DT while moving the film 18.

A sync signal required for a data recording operation is a pulse signal input to P_pi. A capacitor C1 connected to the collector of the transistor Q1 serves to supply a stable current to the magnetic head 28 even if the battery voltage ($V_{EE}$) of the camera body 10 varies. During a data recording operation, since the motor for driving a film is rotated, the battery voltage varies greatly.

An imprinting LED unit 84 is used to imprint date data on a film. The LEDs constituting the respective segments can be turned on by turning on transistors Q10 to Q17. The respective transistors are turned on when output ports P_A to P_G and P_DP are set at high level. A transistor Q20 is used to drive a solenoid 86. When an output port P_MG is set at high level, a current flows in the solenoid 86. The solenoid 86 then presses the magnetic head 28 against the film 18.

The EEPROM 24 serves to temporarily store data to be recorded by the magnetic head 28. A data recording operation is performed in synchronism with a film rewind operation with respect to the film 18. Therefore, the data needs to be stored in a nonvolatile memory until this operation is started.

A communication circuit 88 is a circuit for receiving control signals from the outside of the camera and data prepared outside the camera. The serial communication line of the personal computer PC can be connected to the communication circuit 88.

A rear cover display circuit 90 displays an operation mode, data stored in the EEPROM 24, and the like in accordance with commands from the module microcomputer 22. The operation switches (SWs) 40 are used, for example, to set an operation mode and process data stored in the EEPROM 24.

Figure 5:
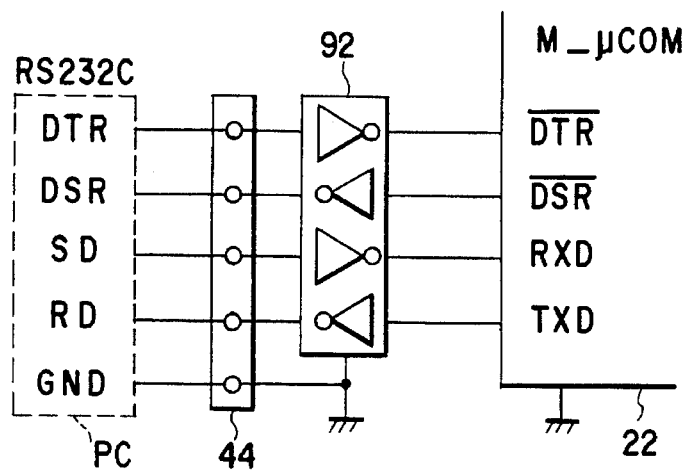
FIG. 5 is a block diagram showing a communication circuit between the rear cover module and a personal computer (PC) arranged outside the camera.

FIG. 5 shows a communication circuit for communication between the rear cover module 36 and the personal computer PC arranged outside the camera. The personal computer PC incorporates an RS232C port as a standard port. The module microcomputer 22 can be controlled by using the personal computer PC through four signal lines of the RS232C port. The four signal lines are connected to the rear cover module 36 through a connector 44.

The personal computer PC transfers data to the module microcomputer 22 through the SD line. This data is input through a serial data reception port RXD of the module microcomputer 22. The module microcomputer 22 transfers data to the personal computer PC through the RD line. This data is output from a serial data transmission port TXD of the module microcomputer 22.

Serial communication is performed by an asynchronous communication scheme requiring no sync clock signal. Reference symbols DTR and DSR respectively denote control lines used to properly control data transmission and reception timings. Since the signal level of the RS233C standards is different from that of the module microcomputer 22, a signal level converter 92 is required. A communication protocol will be described later.

Figure 6A:
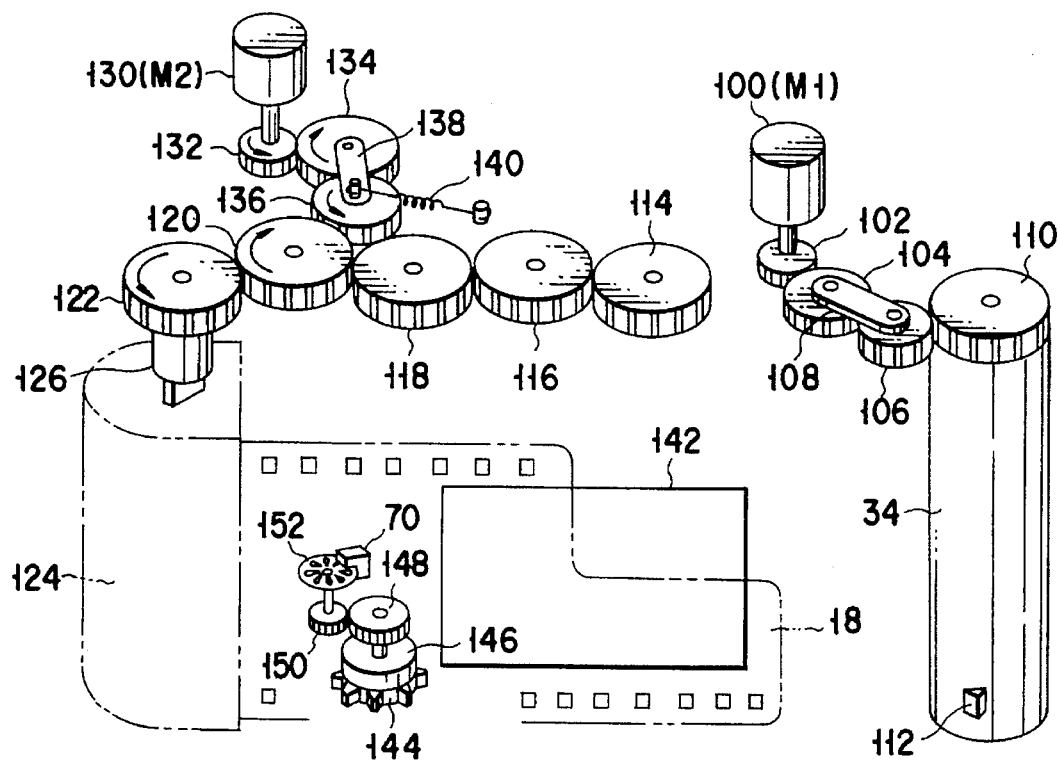
FIG. 6A is a perspective view showing a film feed mechanism when viewed from the rear side of the camera body.
Figure 6B:
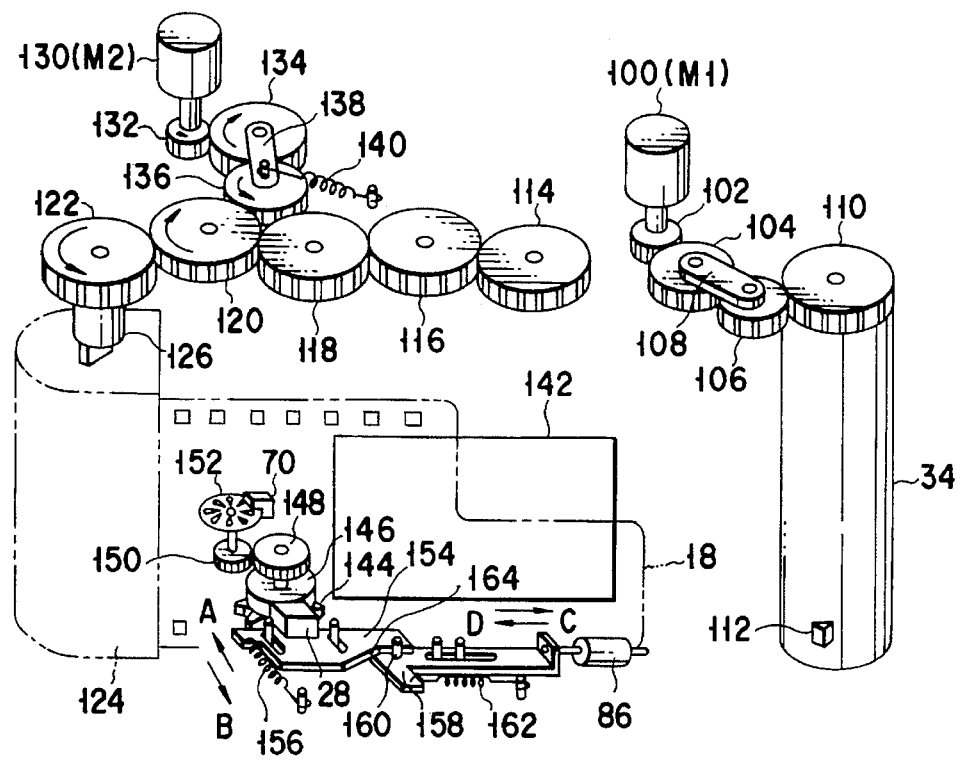
FIG. 6B is a perspective view showing the film feed mechanism of the camera and its peripheral portions in a state in which the rear cover module is mounted on the camera body.
Figure 7:
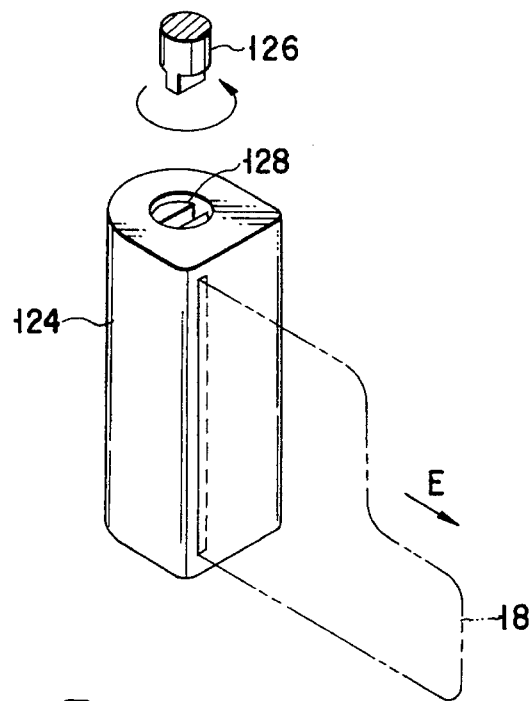
FIG. 7 is a perspective view of a film cartridge.

FIGS. 6A and 6B are perspective views showing the film feed mechanism of the camera and its peripheral portions according to the embodiment when viewed from the rear side of the camera body. FIG. 6A is a perspective view showing the film feed mechanism when viewed from the rear side of the camera body. FIG. 6B is a perspective view showing a state in which the rear cover module is mounted on the camera body. FIG. 7 is a perspective view showing a film cartridge.

A pinion gear 102 is mounted on the output shaft of a film wind/rewind motor 100 (M1) arranged in the camera body 10. The pinion gear 102 is meshed with a sun gear 104. The sun gear 104 is meshed with a planetary gear 106. The planetary gear 106 is supported through a gear arm 108 so as to revolve around the axis of rotation of the sun gear 104.

The take-up spool 34 for taking up a film is rotatably arranged in a film take-up chamber (not shown) formed in the camera body on the right side when viewed from its rear side. A spool gear 110 is integrally formed on the upper end face of the take-up spool 34. The spool gear 110 is meshed with the planetary gear 106 when it revolves counterclockwise. In addition, a lock pawl 112 extends from the lower portion of the outer surface of the take-up spool 34 so as to be engaged with each of perforations (to be described later) in the film.

An idle gear 114 is disposed at a position where it is meshed with the planetary gear 106 when the planetary gear 106 revolves clockwise. In this case, as shown in FIGS. 6B and 6A, the planetary gear 106 is coupled to a coupler gear 122 (to be described later) through the idle gear 114 and idle gears 116, 118, and 120.

The film cartridge housing chamber 32 (see FIG. 2) for housing a film cartridge 124 is formed in the camera body on the left side when viewed from its rear side. A coupler gear 122 having a coupler 126 is rotatably arranged above the film cartridge 124. The coupler 126 has a distal end extended in the form of a minus sign (−). As shown in FIG. 7, the coupler 126 is engaged with a spool groove 128 formed in the upper end face of the film cartridge 124 so as to be integrally rotated with the spool groove 128 about an axis.

A film feed motor 130 (M2) is also arranged in the camera body 10. A pinion gear 132 is mounted on the output shaft of the film feed motor 130. The pinion gear 132 is meshed with a sun gear 134. A planetary gear 136 is meshed with the sun gear 134 and is also supported through a gear arm 138 so as to revolve around the axis of rotation of the sun gear 134. Since the tension of a spring 140 acts on the gear arm 138, the planetary gear 136 is meshed with the idle gear 120 only when the film feed motor 130 (M2) is rotated counterclockwise.

The film 18 is exposed to light through an opening portion 142 formed in the camera body 10. A sprocket 144 is disposed near the opening portion 142. The sprocket 144 is meshed with the perforations of the film 18 and is rotated in synchronism with the movement of the film 18. The sprocket 144 is integrally formed with a press roller 146. A gear 148 is integrally formed with the rotating shaft of the sprocket 144. The gear 148 is meshed with a gear 150. In addition, a disk 152 having slits is integrally mounted on the rotating shaft of the gear 150.

When the sprocket 144 is rotated, the disk 152 is rotated at a rotational speed which is increased by the gears 148 and 150. Every time one of the slits of the disk 152 crosses the photointerrupter 70, the photointerrupter 70 outputs a signal. This signal is converted into a pulse signal by the signal processing circuit 68.

The rear cover module also has a mechanism for pressing the magnetic head 28 against the film 18. The magnetic head 28 is arranged at a position where it opposes the press roller 146 so as to hold the film 18 therebetween. Note that the magnetic head 28 is fixed to a board 154 which can slide in the directions indicated by arrows A and B in FIG. 6B. While the solenoid 86 is not driven, the tension of a spring 156 acts on the board 154 so that the magnetic head 28 does not press the film 18.

The output shaft of the solenoid 86 is fixed to a board 158 which can slide in the directions indicated by arrows C and D in FIG. 6B. A pin 160 fixed to the board 158 is located at the position shown in FIG. 6B because the tension of a spring 162 acts on the board 158. When the solenoid 86 is driven, the board 158 slides in the direction indicated by the arrow D in FIG. 6B, and the pin 160 slides along a side surface 164 of the board 154. As a result, the board 154 slides in the direction indicated by the arrow A in FIG. 6B against the tension of the spring 156, and the magnetic head 28 presses the film 18.

A method of performing communication between the body microcomputer 12 and the module microcomputer 22 will be described next with reference to the timing charts shown in FIGS. 8A through 8G.

In the A- to I-modes, the body microcomputer 12 takes the initiative of communication. Therefore, a communication request is generated by the body microcomputer 12. The body microcomputer 12 changes P_RQ from high level to low level to issue a communication request to the module microcomputer 22. When a communicative state is set, the module microcomputer 22 changes P_en from high level to low level to enable communication with the body microcomputer 12. As a result, the body microcomputer 12 outputs command data to P_D3 to P_D0. Although data to be communicated has an 8-bit form, since the data bus line has a 4-bit form, the data is divided into high- and low-level nibble data to be output.

A latch signal for latching such nibble data is output to P_DL. The first output data is command data. The module microcomputer 22 identifies a communication mode on the basis of this command data, and executes an operation corresponding to the communication mode. When the operation is completed, the module microcomputer 22 changes P_en from low level to high level. Upon detection of this change in P_en, the body microcomputer 12 changes P_RQ from low level to high level, thus terminating the communication operation.

Figure 8A:
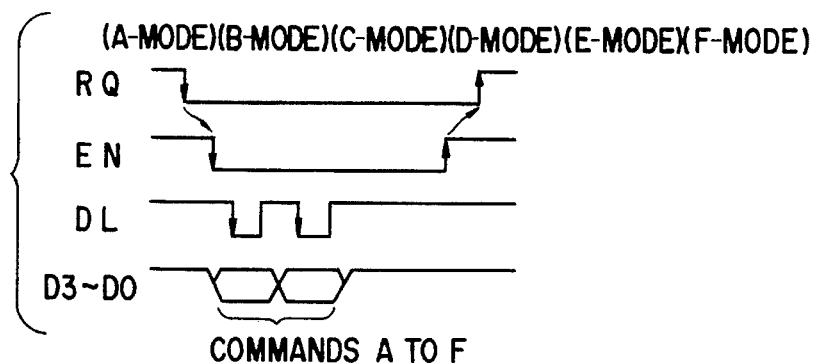

FIG. 8A is a timing chart of a communicating operation in the A to F modes.

The A-mode will be described first. Upon reception a command A, the module microcomputer 22 permits the oscillator X2 to perform an oscillating operation, and uses a clock signal generated by the oscillator X2 as an operation clock signal. With this operation, a low-speed operation mode is shifted to a high-speed operation mode based on the clock signal generated by the oscillator X2.

In the B-mode, upon reception of a command B, the module microcomputer 22 inhibits the oscillating operation of the oscillator X2, and uses a clock signal generated by the oscillator X1 as an operation clock signal. With this operation, the high-speed operation mode based on the clock signal generated by the oscillator X2 is shifted to the low-speed operation mode.

In the C-mode, upon reception of a command C, the module microcomputer 22 supplies a current to the solenoid 86 to press the magnetic head 28 against the film 18.

In the D-mode, upon reception of a command D, the module microcomputer 22 stops supplying a current to the solenoid 86. With this operation, the magnetic head 28 is separated from the film 18.

In the E-mode, the body microcomputer 12 is set in the slave mode upon completion of E-mode communication. An exposure operation in the slave mode is executed on the basis of a command from the module microcomputer 22. The K-, L-, and M-modes (to be described later) are executable only in the slave mode. In order to set the body microcomputer 12 in the slave mode, the module microcomputer 22 needs to be set in an external control mode.

In the F-mode, the body microcomputer 12 performs F-mode communication upon completion of an exposure operation. The body microcomputer 12 then winds up the film 18 by one frame. In synchronism with this film wind operation, the module microcomputer 22 imprints date data on the film 18. The module microcomputer 22 recognizes a command F as an imprinting enable signal.

Figure 8B:
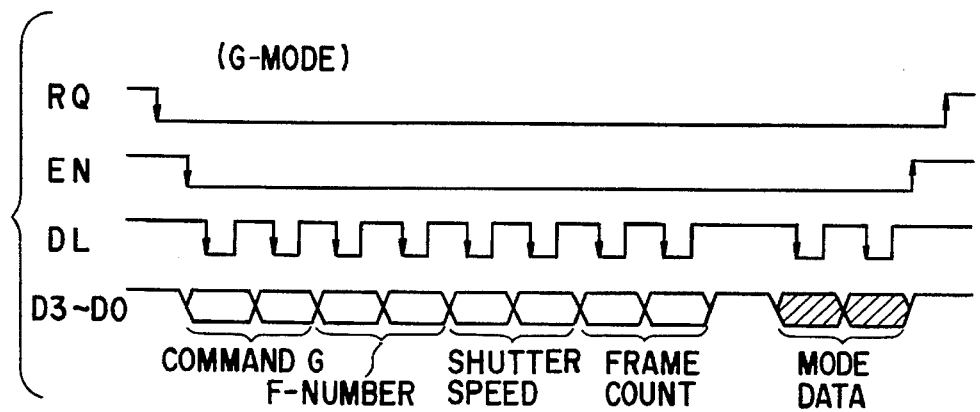

The G-mode will be described next with reference to the timing chart shown in FIG. 8B. Upon outputting a command G, the body microcomputer 12 outputs f-number data, shutter speed data, and frame count data to the module microcomputer 22. These data are displayed by the rear cover display circuit 90 of the rear cover module 36. Upon reception of the data, the module microcomputer 22 outputs mode data to the body microcomputer 12 (the data indicated by the hatched portions in FIG. 8B is data output by the module microcomputer 22). The mode data includes information associated with a trimming mode and the external control mode.

Figure 8C:
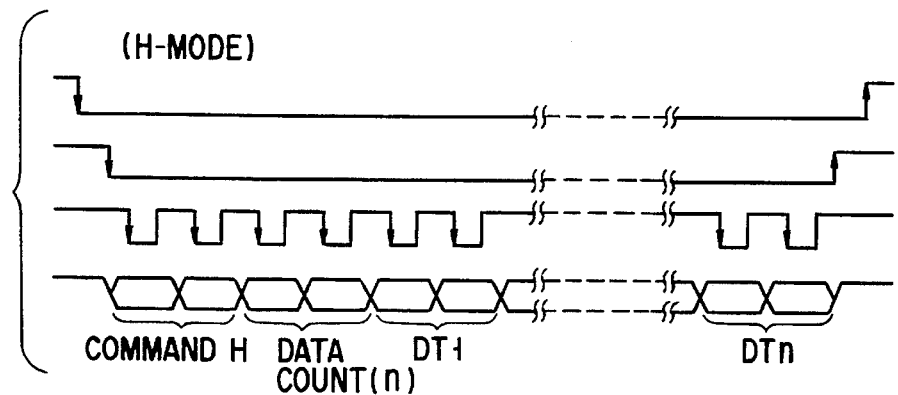

FIG. 8C is a timing chart of the H-mode. In the H-mode, data to be recorded on the magnetic track 16 is stored in the EEPROM 24 of the rear cover module 36. Upon outputting a command H, the body microcomputer 12 outputs data $DT_1$ to $DT(n)$ (to be recorded) to the module microcomputer 22. Data count (n) is determined in consideration of a case where the module microcomputer 22 receives the data.

Figure 8D:
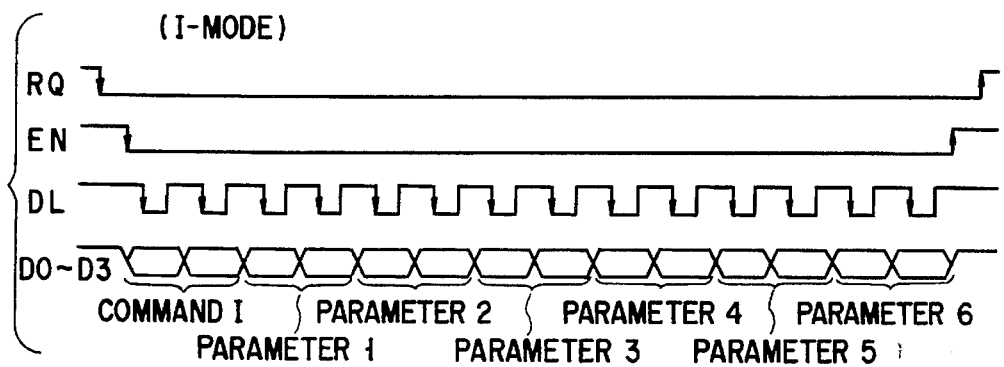

FIG. 8D is a timing chart of the I-mode. Upon outputting a command I, the body microcomputer 12 outputs six parameters. These parameters are required when the module microcomputer 22 executes an imprinting operation and a data recording operation.

Figure 8E:
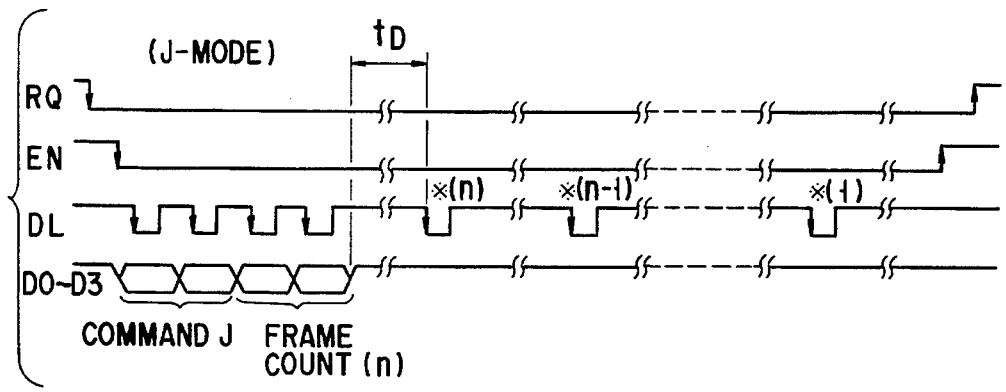

The J-mode will be described next with reference to the timing chart shown in FIG. 8E. The J-mode is a mode for recording data on the magnetic track 16. Communication in the J-mode is executed simultaneously with rewinding of the film 18, for which photography is completed, into the film cartridge 124. Upon outputting a command J, the body microcomputer 12 outputs the frame count (n). The frame count of the latest film which has undergone photography (the value of a film counter) is set in the value n.

The module microcomputer 22 records the data from the nth frame to the first frame on the magnetic track. Upon outputting the frame count(n), the body microcomputer 12 outputs recording operation start signals (indicated by *(n), *(n−1) . . . , *(1) in the timing chart shown in FIG. 8E) from P_DL. Every time the module microcomputer 22 receives this signal, the module microcomputer 22 reads out one-frame data from the EEPROM 24 and records it on the magnetic track 16.

In the K-, L-, and M-modes, the module microcomputer 22 takes the initiative of communication. Therefore, a communication request is generated by the module microcomputer 22. The module microcomputer 22 changes P_rq from high level to low level to issue a communication request to the body microcomputer 12. When a communicative state is set, the body microcomputer 12 changes P_EN from high level to low level to enable communication with the module microcomputer 22. The module microcomputer 22 then outputs command data to P_d3 to P_d0.

A latch signal for latching data is output to P_d1. The first output data is command data. The body microcomputer 12 identifies a communication mode on the basis of this command data, and executes an operation corresponding to the communication mode. When the operation is completed, the body microcomputer 12 changes P_EN from low level to high level. Upon detection of this change in P_EN, the module microcomputer 22 changes P_rq from low level to high level, thus terminating the communication operation.

Figure 8F:
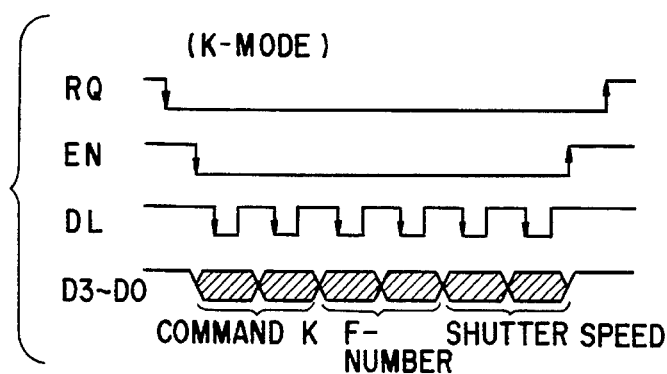

The K-mode will be described next with reference to the timing chart shown in FIG. 8F. Upon outputting a command K, the module microcomputer 22 outputs f-number and shutter speed data. The body microcomputer 12 performs an exposure operation with respect to the film 18 on the basis of the f-number and shutter speed data input from the module microcomputer 22. The f-number and shutter speed data are data input from the outside of the camera (see the timing chart shown in FIG. 9B to be described later).

Figure 8G:
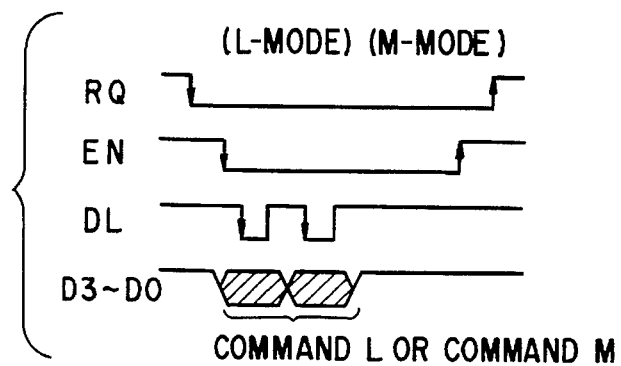

FIG. 8G is a timing chart of the L- and M-modes.

In the L-mode, upon reception of a command L, the body microcomputer 12 automatically determines an f-number and a shutter speed and executes an exposure operation. The command K designates a manual exposure operation, while the command L designates an automatic exposure operation.

In the M-mode, the module microcomputer 22 executes M-mode communication when the external control mode is canceled. Upon reception of a command M, the body microcomputer 12 cancels the slave mode. After the slave mode is canceled, an exposure operation cannot be executed in accordance with a command from the module microcomputer 22.

When the rear cover module 36 is set in the external control mode, the operation of the camera can be controlled on the basis of control signals from the personal computer arranged outside the camera. A control signal from the personal computer is input to the module microcomputer 22. The module microcomputer 22 controls the body microcomputer 12 in accordance with the input control signal.

A communication protocol between the personal computer PC and the module microcomputer 22 will be described below with reference to the timing charts shown in FIGS. 9A through 9D.

When the personal computer PC opens the communication lines of the RS232C, a signal $\overline{\text{DTR}}$ from the module microcomputer 22 changes from high level to low level. Upon detecting that the signal $\overline{\text{DTR}}$ is set at low level, the module microcomputer 22 changes a signal $\overline{\text{DSR}}$ from high level to low level. When the signal $\overline{\text{DSR}}$ is set at low level, the personal computer PC determines that the module microcomputer 22 is set in a communicative state. Upon this determination, the personal computer PC outputs command data, used by the module microcomputer 22 to identify a communication mode, to the module microcomputer 22.

In any communication mode, therefore, communication data is headed by the above-mentioned command data. When the module microcomputer 22 transfers an end code to the personal computer PC, the communication mode is ended. Upon reception of the end code, the personal computer PC closes the communication lines of the RS232C. The signal $\overline{\text{DTR}}$ changes from low level to high level. Upon detection of this change, the module microcomputer 22 changes the signal $\overline{\text{DSR}}$ from low level to high level to inhibit a communicating operation.

Figure 9A:
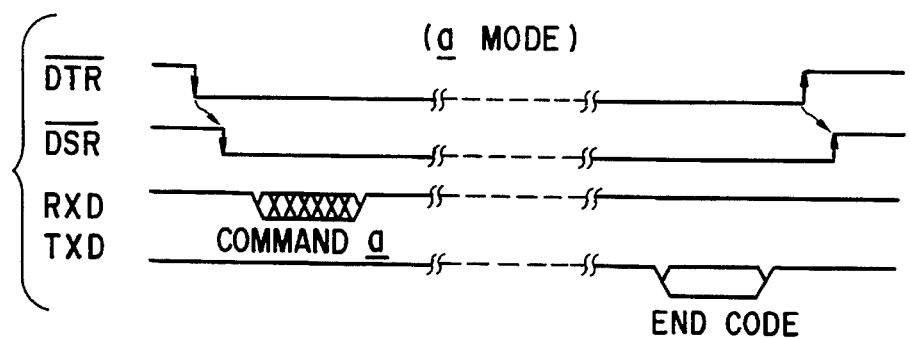

FIG. 9A is a timing chart of the a mode. Upon reception of a command a, the module microcomputer 22 executes L-mode communication. The body microcomputer 12 then executes an automatic exposure operation. This operation is the same as that performed when the release switch REL SW is turned on. When the L-mode communication operation is completed, the module microcomputer 22 outputs an end code from TXD.

Figure 9B:
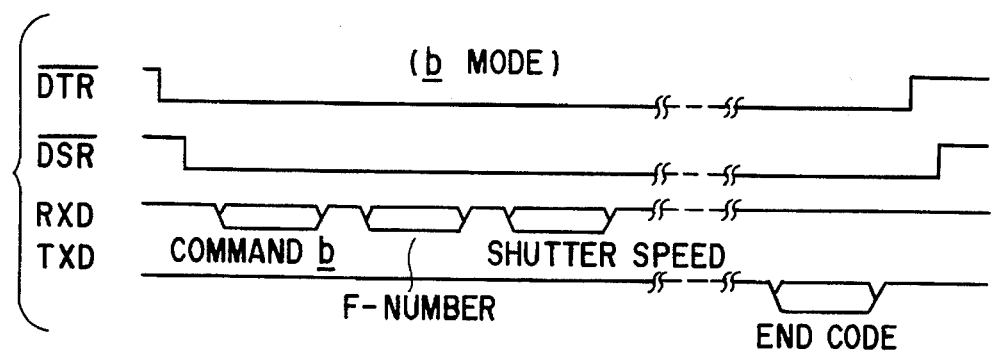

FIG. 9B is a timing chart of a b mode. Upon transferring a command b, the personal computer PC transfers f-number and shutter speed data to the module microcomputer 22. The module microcomputer 22 executes K-mode communication. In this communication, the body microcomputer 12 receives the f-number and shutter speed data from the personal computer PC. The body microcomputer 12 then executes an exposure operation based on these data. After the K-mode communication is completed, the module microcomputer 22 outputs an end code from TXD.

In the b mode, since no distance measuring operation is performed, the user must manually performs focus control. The b mode is set in consideration of a case where photography is performed while the camera is connected to a microscope or an endoscope.

FIG. 9C is a timing chart of a c mode. In the c mode, data transferred from the personal computer PC is stored in the EEPROM 24 of the rear cover module 36. The personal computer PC outputs address data for the EEPROM 24 after outputting a command c. The module microcomputer 22 causes a data storage circuit 72 to store data $DT_1$ to $DT_n$ in accordance with this address data. Data count (n) is determined in consideration of a case where the module microcomputer 22 loads the data. When all the data are stored, the module microcomputer 22 outputs an end code.

FIG. 9D is a timing chart of a d mode. In the d mode, the personal computer PC reads out data from the EEPROM 24 of the rear cover module 36. Upon outputting a command d, the personal computer PC outputs address data for the EEPROM 24 and data indicating a desired data count. The module microcomputer 22 reads out n data ($DT_1$ to $DT_n$) in accordance with the address data. The read data are then output from TDX. When the transfer of the n data is completed, the module microcomputer 22 outputs an end code.

The operation of the body microcomputer 12 will be described next with reference to the flow charts shown in FIGS. 10 through 13.

Figure 10:
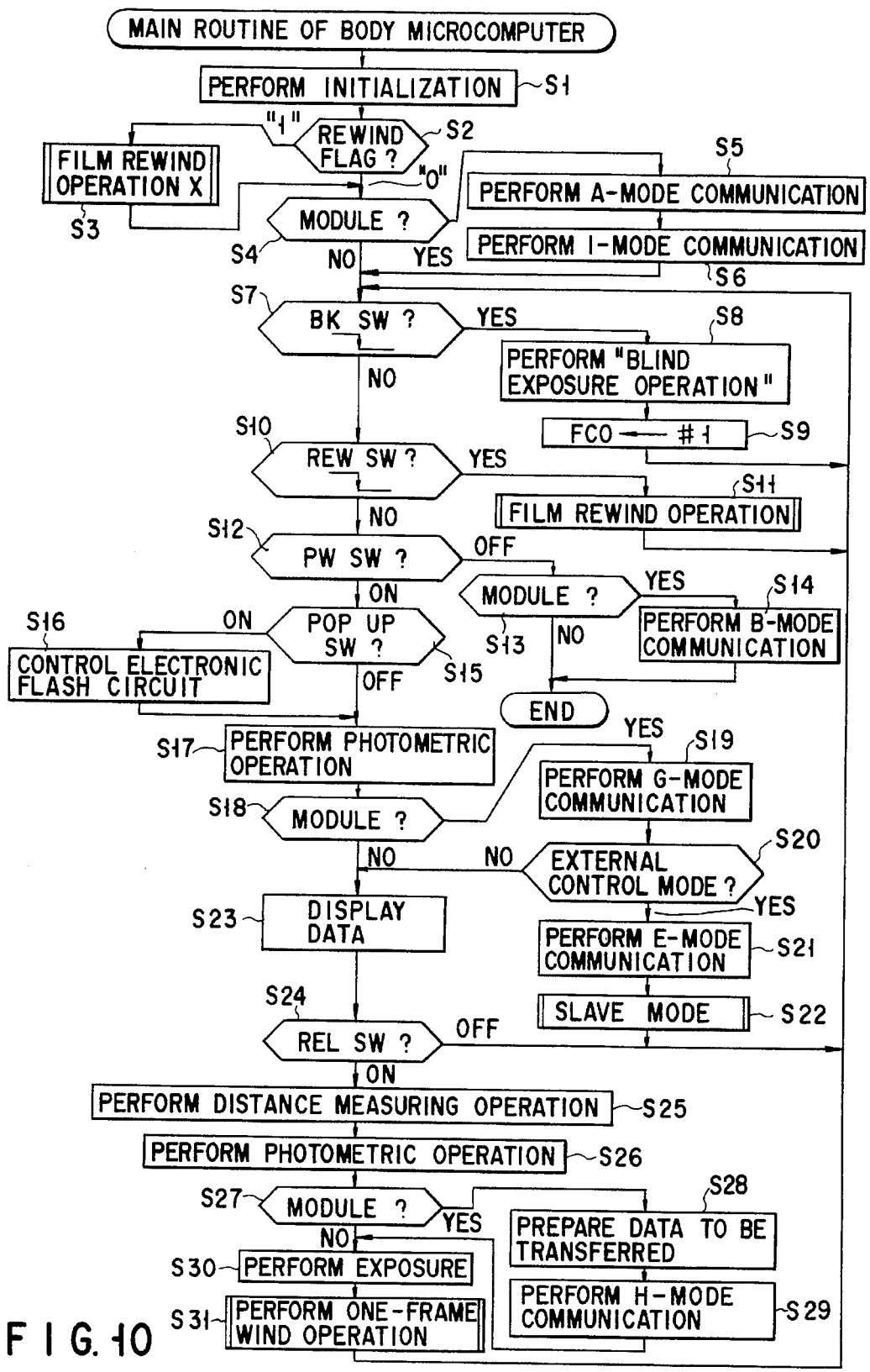
FIG. 10 is a flow chart for explaining the operation of the body microcomputer.

The main routine will be described first with reference to FIG. 10.

When the power switch PW SW is turned on, the body microcomputer 12 is power-on-reset, and starts an operation. In step S1, the body microcomputer 12 starts the DC/DC converter 76 and performs initialization of the I/O port, the memory, and the like. In step S2, the body microcomputer 12 checks the presence/absence of a rewind flag. If the flag is set, the flow advances to step S3 to execute a subroutine "film rewind operation X". The rewind flag is set when rewinding of the film 18 is stopped halfway.

In step S4, the body microcomputer 12 checks whether the rear cover module 36 is mounted on the camera body 10.

The body microcomputer 12 can determine the presence/absence of the rear cover module 36 by checking the state of P_CHM. If P_CHM is at low level, the rear cover module 36 is mounted on the camera body 10. When the rear cover module 36 is mounted on the camera body 10, the flow advances to step S5. In step S5, the body microcomputer 12 executes A-mode communication. In this communication, the module microcomputer 22 shifts to the high-speed operation mode. In step S6, I-mode communication is executed. The module microcomputer 22 receives parameters required for the execution of an imprinting operation and a data recording operation.

In step S7, the body microcomputer 12 checks the state of the rear cover switch BK SW. If the rear cover switch BK SW is changed from an OFF state to an ON state, the flow advances to step S8. This change means that the film cartridge 124 is loaded, and the rear cover of the camera is changed from an open state to a closed state. In step S8, a "blind-exposure operation" is performed to wind the film 18 around the take-up spool. In step S9, a film counter FCO is set to "1". The flow then returns to step S7.

When the flow advances from step S7 to step S10, the body microcomputer 12 checks the state of the rewind switch REW SW. When the rewind switch REW SW is operated, the flow advances to step S11 to execute a subroutine "film rewind operation". The module microcomputer 22 records data on the magnetic track 16 of the film 18 in synchronism with rewinding of the film 18. Thereafter, the flow returns to step S7.

In step S12, the body microcomputer 12 checks the state of the power switch PW SW. If the power switch PW SW is OFF, the operation of the camera is inhibited, and the flow advances to step S13. In step S13, the body microcomputer 12 checks the presence/absence of the module. If the module is not present, the body microcomputer 12 terminates its operation by stopping the operation of the DC/DC converter 76. If the module is present, the flow advances to step S14 to terminate the operation after completing B-mode communication. With the processing in step S14, the module microcomputer 22 shifts to the low-speed operation mode. At this time, since no power is supplied from the camera body 10, the module microcomputer 22 is operated by the backup battery 80.

If it is determined in step S12 that the power switch PW SW is ON, the flow advances to step S15 to check the state of the pop-up switch POP UP SW. If the switch is ON, and the electronic flash unit can be used, the flow advances to step S16. In step S16, a command for charging the main capacitor is output to the electronic flash control circuit 60.

In step S17, an f-number and a shutter speed are calculated on the basis of object brightness data from the photometric circuit 46 and film speed data from the DX code reading circuit 62. In step S18, the body microcomputer 12 checks the presence/absence of the module. If the module is present, the flow advances to step S19 to execute G-mode communication. In this step, the body microcomputer 12 outputs the f-number and the shutter speed, calculated in step S17, to the module microcomputer 22 together with a film counter value. The module microcomputer 22 outputs mode data to the body microcomputer 12. Note that the G-mode communication is periodically repeated in the main routine. Therefore, the body microcomputer 12 can detect the operation state of the module microcomputer 22 in real time.

In step S20, the body microcomputer 12 checks on the basis of the mode data whether the module microcomputer 22 is in the external control mode. If the module microcomputer 22 is in the external control mode, the body microcomputer 12 executes E-mode communication in step S21. The body microcomputer 12 is then set in the slave mode. In the slave mode, a subroutine "slave mode" in step S22 is executed.

If it is determined in step S20 that the module microcomputer 22 is not in the external control mode, the flow advances to step S23. In step S23, exposure conditions, the frame count of the film, and the like are displayed. If the module microcomputer 22 is in a trimming mode, a trimming range is displayed in the finder in accordance with the mode.

Figure 14A:
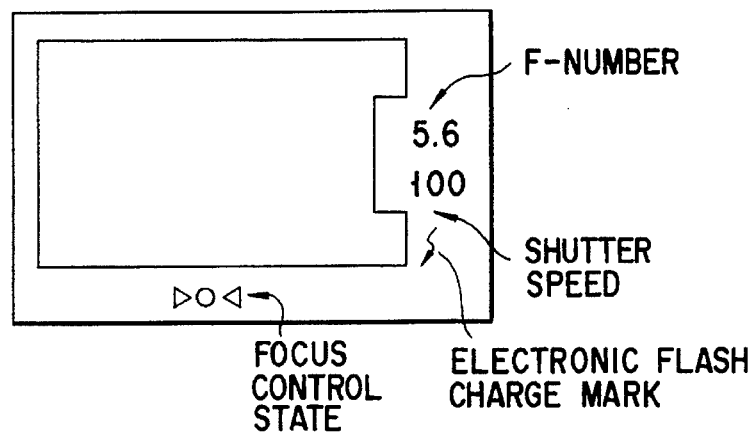
FIGS. 14A through 14D are views showing print ranges in trimming modes.
Figure 14B:
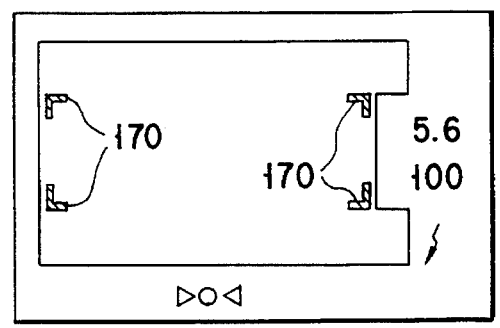

FIGS. 14A through 14D show examples of displays in the finder. FIG. 14A shows a display in a normal mode. FIG. 14B shows a display in trimming mode 1. In this mode, an image in the range defined by L-shaped symbols 170 is printed on print paper. This trimming range is stored, as trimming data, on the magnetic track 16 of the film 18. Therefore, trimming mode 1 cannot be executed unless the rear cover module 36 is mounted on the camera body 10.

Figure 14C:
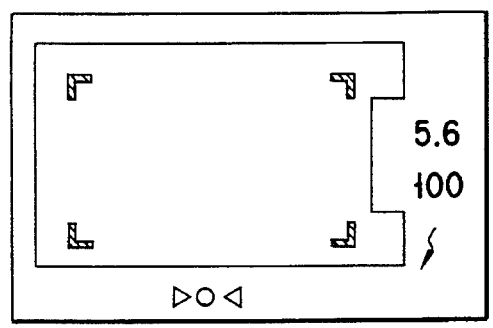
Figure 14D:
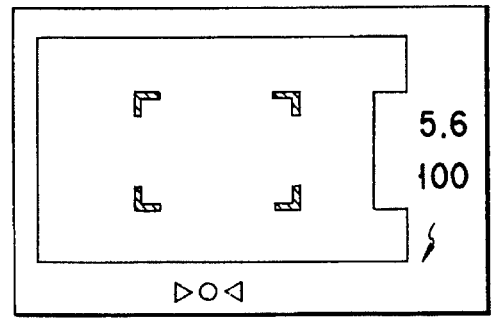

FIG. 14C shows a display in trimming mode 2. FIG. 14D shows a display in trimming mode 3.

In step S24, the body microcomputer 12 checks the state of the release switch REL SW. If the switch is OFF, the flow advances to step S7. If the switch is ON, the flow advances to step S25 to perform focus control with respect to an object to be photographed. In step S26, a photometric operation is performed to determine a final f-number and a final shutter speed.

In step S27, the body microcomputer 12 checks the presence/absence of the module. If the module is present, the flow advances to step S28 to prepare data to be transferred to the module microcomputer 22. This data is recorded on the magnetic track 16 of the film 18. In step S29, H-mode communication is performed to transfer the data to the module microcomputer 22.

If it is determined in step S27 that the module is not present, the flow advances to step S30 to control the shutter control mechanism 50 and the stop control mechanism 52 so as to expose the film 18. In step S31, a subroutine "one-frame wind operation" is executed. The module microcomputer 22 performs a date data imprinting operation in synchronism with a one-frame wind operation.

The subroutine "slave mode" will be described next with reference to FIG. 11. In the slave mode, an exposure operation can be performed in accordance with a command from the module microcomputer 22.

In step S41, the body microcomputer 12 receives a communication request from the module microcomputer 22 through P_RQ. When P_RQ is at low level, the module microcomputer 22 outputs a communication request. In this case, the flow advances to step S42 to change P_EN from high level to low level. Upon detecting that P_EN is set at low level, the module microcomputer 22 outputs command data to the body microcomputer 12. In step S43, the body microcomputer 12 receives the command data output put from the module microcomputer 22.

In step S44, the body microcomputer 12 checks whether the command data is the command L. If YES in step S44, the flow advances to step S45 to change P_EN from low level to high level. When L-mode communication is executed, the module microcomputer 22 must execute an automatic exposure operation. In step S46, focus control is performed with respect to the object. In step S47, an f-number and a shutter speed are calculated.

In step S54, the body microcomputer 12 prepares data to be recorded on the magnetic track 16 of the film 18. This data is transferred to the module microcomputer 22 in step S55. In step S56, the film 18 is exposed. The flow then advances to step S57 to wind up the film 18. Thereafter, the flow advances to step S41 to perform the next communication.

If it is determined in step S44 that the command data is not the command L, the flow advances to step S48 to check whether the command data is the command K. If YES in step S48, the body microcomputer 12 receives the f-number and shutter speed data from the module microcomputer 22 in steps S49 and S50. In step S51, the body microcomputer 12 changes P_EN from low level to high level. In the L-mode, the film 18 is exposed on the basis of the exposure data from the module microcomputer 22. In this case, focus control is not performed. The flow then advances from step S51 to step S54.

If it is determined in step S48 that the command data is not the command K, the flow advances to step S52 to check whether the command data is the command M. If YES in step S52, the flow advances to step S53 to change P_EN from low level to high level. Thereafter, the flow returns to the main routine. The command M is command data for canceling the slave mode of the body microcomputer 12. When the external control mode of the module microcomputer 22 is canceled, the module microcomputer 22 executes M-mode communication.

Figure 12:
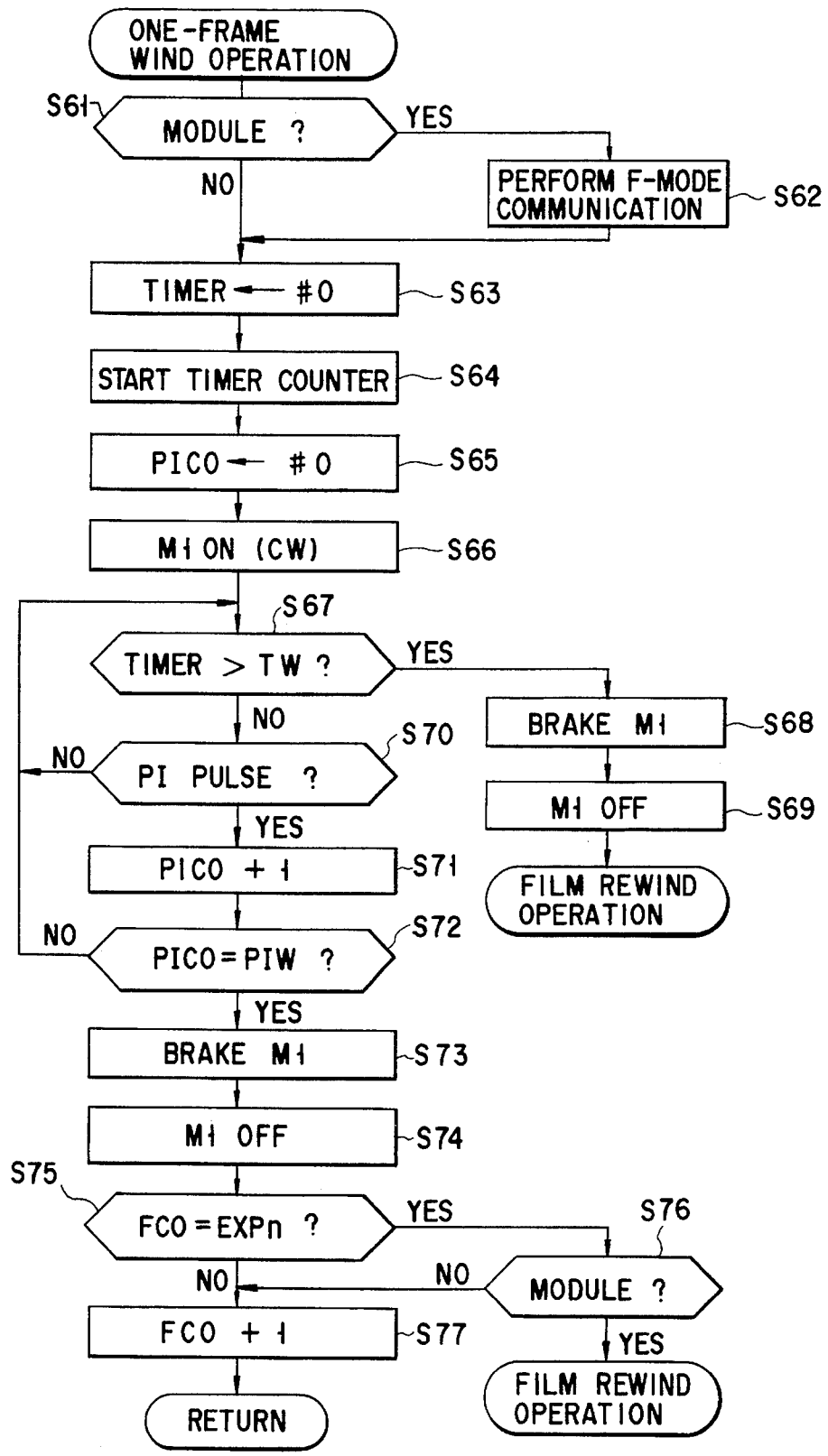
FIG. 12 is a flow chart showing a subroutine for explaining a "one-frame film wind operation"

The subroutine "one-frame wind operation" will be described next with reference to FIG. 12.

In step S61, the body microcomputer 12 checks the presence/absence of the module. If the rear cover module 36 is mounted on the camera body 10, the flow advances to step S62 to perform F-mode communication. With this communication, the module microcomputer 22 detects that a one-frame wind operation is executed, and prepares for an imprinting operation.

In step S63, the timer counter is cleared. In step S64, the count operation of the timer counter is started. The timer counter is used to detect the end of the film 18. When the one-frame wind operation is not completed after the lapse of a processing time (Tw), it is determined that the film 18 is wound up to the end. In step S65, a register PICO is cleared. The register PICO is used to count pulse signals output from the signal processing circuit 68. In step S66, the motor M1 is rotated clockwise. With this operation, the spool winds up the film 18.

In step S67, the body microcomputer 12 checks whether the timer counter value is larger than Tw. If YES in step S67, the flow advances to step S68 to brake the motor M1. In step S69, the motor M1 is deenergized. Thereafter, the flow advances to the subroutine "film rewind operation".

If it is determined in step S67 that the timer counter value is smaller than Tw, the flow advances to step S70. In step S70, the body microcomputer 12 checks whether a pulse signal from the signal processing circuit 68 is input to P_PI. If NO in step S70, the flow returns to step S67. If YES in step S70, the flow advances to step S71. In step S71, the register PICO is incremented.

In step S72, the body microcomputer 12 checks whether PICO coincides with PIW. PIW indicates the number of signals generated from PI when the film 18 is wound up by one frame. If NO in step S72, the flow returns to step S67 to continue the film wind operation. When the film 18 is wound up by one frame, the flow advances to step S73 to brake the motor M1. In step S74, the motor M1 is deenergized.

In step S75, the body microcomputer 12 checks whether the value of the film counter FCO is equal to EXPn. EXPn indicates the photographic frame count of the loaded film 18. This EXPn data is input from the DX code reading circuit 62. If NO in step S75, the flow advances to step S77 to increment FCO. Thereafter, the flow returns to the main routine.

If it is determined in step S75 that FCO is equal to EXPn, the flow advances to step S76. In step S76, the body microcomputer 12 checks the presence/absence of the module. If the module is not present, the flow advances to step S77. If the module is present, the flow advances to the subroutine "film rewind operation". When the module is not present, photography is performed until the film 18 is wound up to the end. Therefore, the flow advances from step S76 to S77.

When the module is present, photography cannot be performed up to the end of the film 18. This is because a date data imprinting operation is performed with respect to the film 18 in synchronism with a film wind operation. If the film 18 is not completely wound up, there is no guarantee that all the data are imprinted. For example, in the case of a 24 EXP film, 25 frames can be photographed. Therefore, at the 24th frame, a film wind operation can always be performed by one frame. For the above-described reason, the processing in steps S75 and S76 is added.

Figure 13:
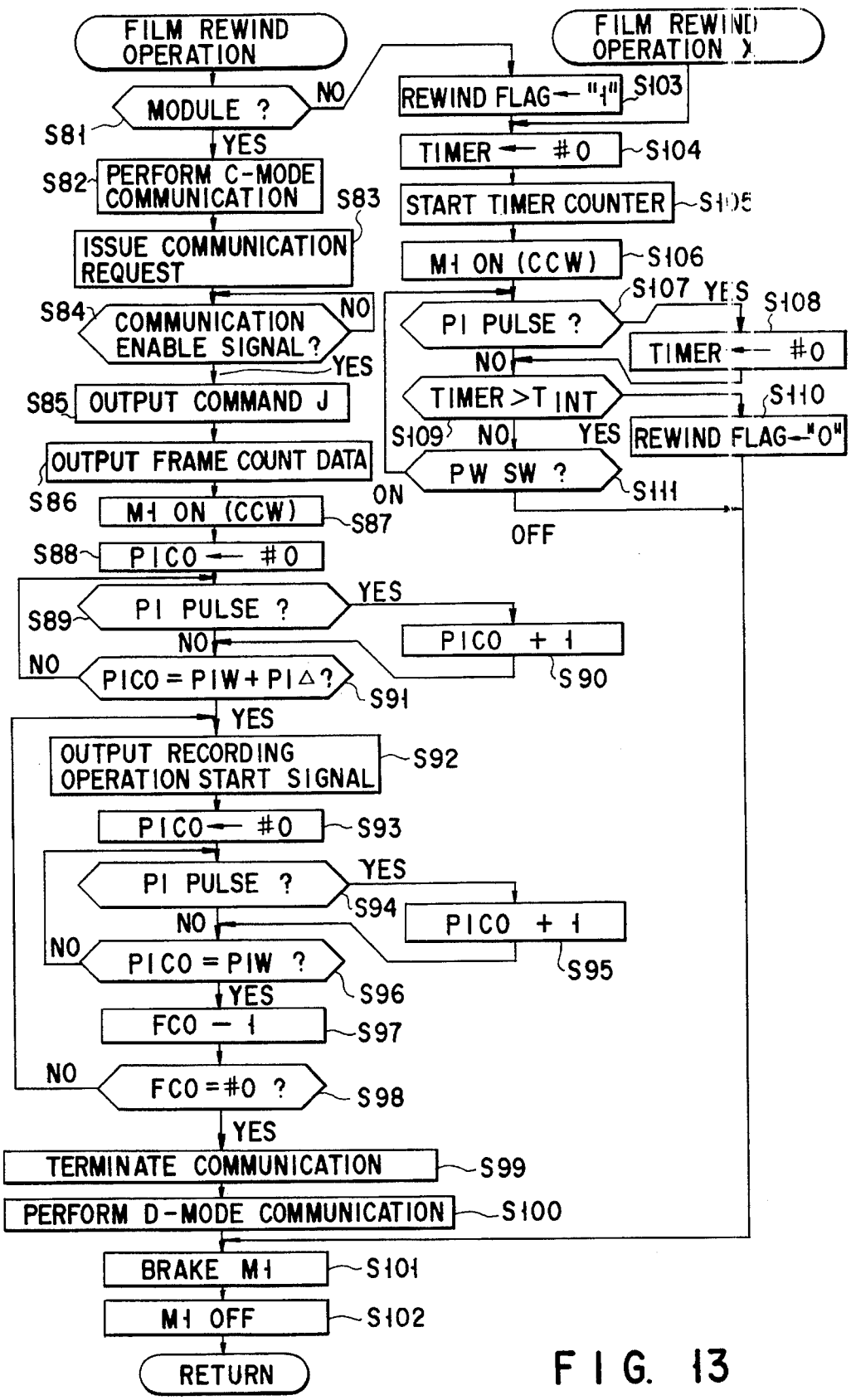
FIG. 13 is a flow chart showing a subroutine for explaining a "film rewind operation"

The subroutine "film rewind operation" will be described next with reference to FIG. 13. This subroutine is executed to rewind the film 18 into the film cartridge 124. In parallel with this operation, the module microcomputer 22 records the data, stored in the EEPROM 24, on the magnetic track 16 of the film 18.

In step S81, the body microcomputer 12 checks the presence/absence of the module 36. If the rear cover module 36 is not mounted on the camera body 10, the flow advances to step S103. A film rewind operation to be performed when the module is not present will be described first.

In step S103, the rewind flag is set (←"1"). The rewind flag is then stored in the storage circuit 58. This flag must maintain the set state during a power-OFF period. Note that the rewind flag is cleared (←"0") when the film rewind operation is completed.

In step S104, the timer counter is cleared. In step S105, the count operation of the timer counter is started. With this timer counter, it is checked whether the film rewind operation is completed. In step S106, the motor M1 is rotated counterclockwise. With this operation, the film 18 is rewound into the film cartridge 124.

In step S107, the body microcomputer 12 checks whether a pulse signal is input to P_PI. If YES in step S107, the flow advances to step S108 to clear the timer counter. In step S109, the body microcomputer 12 checks whether the timer counter value is larger than a predetermined value ($T_{INT}$). When the film 18 is completely housed in the film cartridge 124, the rotation of the sprocket 144 is stopped, and no pulse is generated. The timer counter is then incremented, and the flow advances from step S109 to step S110. In step S110, the rewind flag is cleared. Thereafter, the flow shifts to step S101 to stop the motor M1.

When the flow advances from step S109 to step S111, the body microcomputer 12 checks the state of the power switch PW SW. If the switch is ON, the flow shifts to step S107. If the switch is OFF, the flow shifts to step S101 to stop the film rewind operation. In this case, since the processing in step S110 is not performed, the flag is kept set.

When the flow returns to the main routine while the power switch PW SW is OFF, the operation of the body microcomputer 12 is stopped. However, since the flag is still left, when the operation of the body microcomputer 12 is started, the subroutine "film rewind operation X" is called (steps S2 and S3 in the main routine in FIG. 10). The remaining portion of the film 18 is then rewound into the film cartridge 124. A film rewind operation can be stopped halfway only when the module is not present. When the module is present, data is recorded on the magnetic track 16 in synchronism with a film rewind operation. Therefore, interruption of rewinding of the film 18 cannot be permitted.

An operation to be performed when the module is mounted on the camera body will be described next.

When the flow advances from step S81 to step S82, C-mode communication is performed. The module microcomputer 22 supplies a current to the solenoid 86 to press the magnetic head 28 against the film 18.

In the following processing in steps S83 to S99, J-mode communication is performed simultaneously with rewinding of the film 18. FIG. 8E is a timing chart of J-mode communication.

In step S83, the body microcomputer 12 changes P_RQ from high level to low level to issue a communication request to the module microcomputer 22. In step S84, the body microcomputer 12 waits for a communication enable signal from the module microcomputer 22. When the body microcomputer 12 outputs the command J in step S85, the body microcomputer 12 outputs frame count data in step S86. In this case, the value of the film counter FCO is the frame count data. In step S87, the motor M1 is rotated counterclockwise. With this operation, the film 18 is rewound into the film cartridge 124.

In step S88, the register PICO is cleared. The register PICO is used to count pulse signals input to P_PI. In step S89, the body microcomputer 12 checks whether a pulse signal is input. If YES in step S89, the flow advances to step S90 to increment the register PICO.

In step S91, the body microcomputer 12 checks whether the value of the register PICO coincides with PIW+PIΔ. If NO in step S91, the flow shifts to step S89 to continue the pulse count operation. If YES in step S91, the flow advances to step S92 to output a recording operation start signal (the signal indicated by *(n) in FIG. 8E) to P_DL. Upon reception of this signal, the module microcomputer 22 records nth-frame data on the magnetic track 16. The above-described processing in steps S89 to S91 corresponds to $t_D$ in FIG. 8E. With the processing in steps S89 to S91, a delay of $t_D$ is caused between the instant when the film 18 starts to move and the instant when a data recording operation is started.

The reasons for the processing in steps S89 to S91 will be described below with reference to FIGS. 15A and 5B.

Assume that the magnetic head 28 is offset from the opening portion 142 of the camera toward the film cartridge 124 by an offset amount Δ, as shown in FIG. 15A. The value PIΔ is obtained by converting this offset value Δ into a pulse signal count. The value W is the moving amount of the film 18 in the case where the film is wound up by one frame. The value PIW is obtained by converting the value W into a pulse signal count.

With the processing in steps S89 to S91, no data recording operation is executed in the interval indicated by Δ+W. With this operation, a photographic frame coincides with the position where corresponding data is to be recorded. If a photographic frame is offset from a corresponding data recording position, inconveniences occur when the film 18 is cut.

When the magnetic head 28 is located at the position shown in FIG. 15B, positioning of the magnetic head 28 can be properly performed by slightly modifying the processing in step S91. More specifically, positioning can be performed by only changing PIW+PIΔ to PIW−PIΔ.

The processing in steps S89 to S91 has another important meaning. FIG. 16 shows changes in film moving speed immediately after a film wind operation is started. Referring to FIG. 16, the interval indicated by $L_0$ is an acceleration interval before the moving speed of the film 18 becomes almost constant. In this interval, in which the moving speed is unstable, data cannot be recorded on the magnetic track 16. The interval $L_0$ can be removed by the processing in steps S89 to S91. However, the magnetic head 28 must be located to satisfy W+Δ>$L_0$ (or W−Δ>$L_0$).

Referring to FIG. 13 again, the register PICO is cleared in step S93. In step S94, the body microcomputer 12 checks whether a pulse signal is input. If YES in step S94, the flow advances to step S95 to increment the register PICO. In step S96, the body microcomputer 12 checks whether PICO coincides with PIW. In this manner, the processing in steps S94 to S96 is continued until the film 18 is rewound by one frame. If the film 18 is rewound by one frame, the flow advances to step S97.

In step S97, the film counter FCO is decremented. In step S98, the body microcomputer 12 checks whether FCO is "0". If NO in step S98, the flow returns to step S92 to continue the film rewind operation. If YES in step S98, the flow advances to step S99 to terminate the J-mode communication. In step S100, D-mode communication is performed. With this communication, the module microcomputer 22 deenergizes the solenoid 86.

In step S101, the motor M1 is braked. In step S102, the motor M1 is deenergized. Thereafter, the flow returns to the main routine.

The operation of the module microcomputer 22 will be described next with reference to the flow charts shown in FIGS. 17 through 23.

Figure 17:
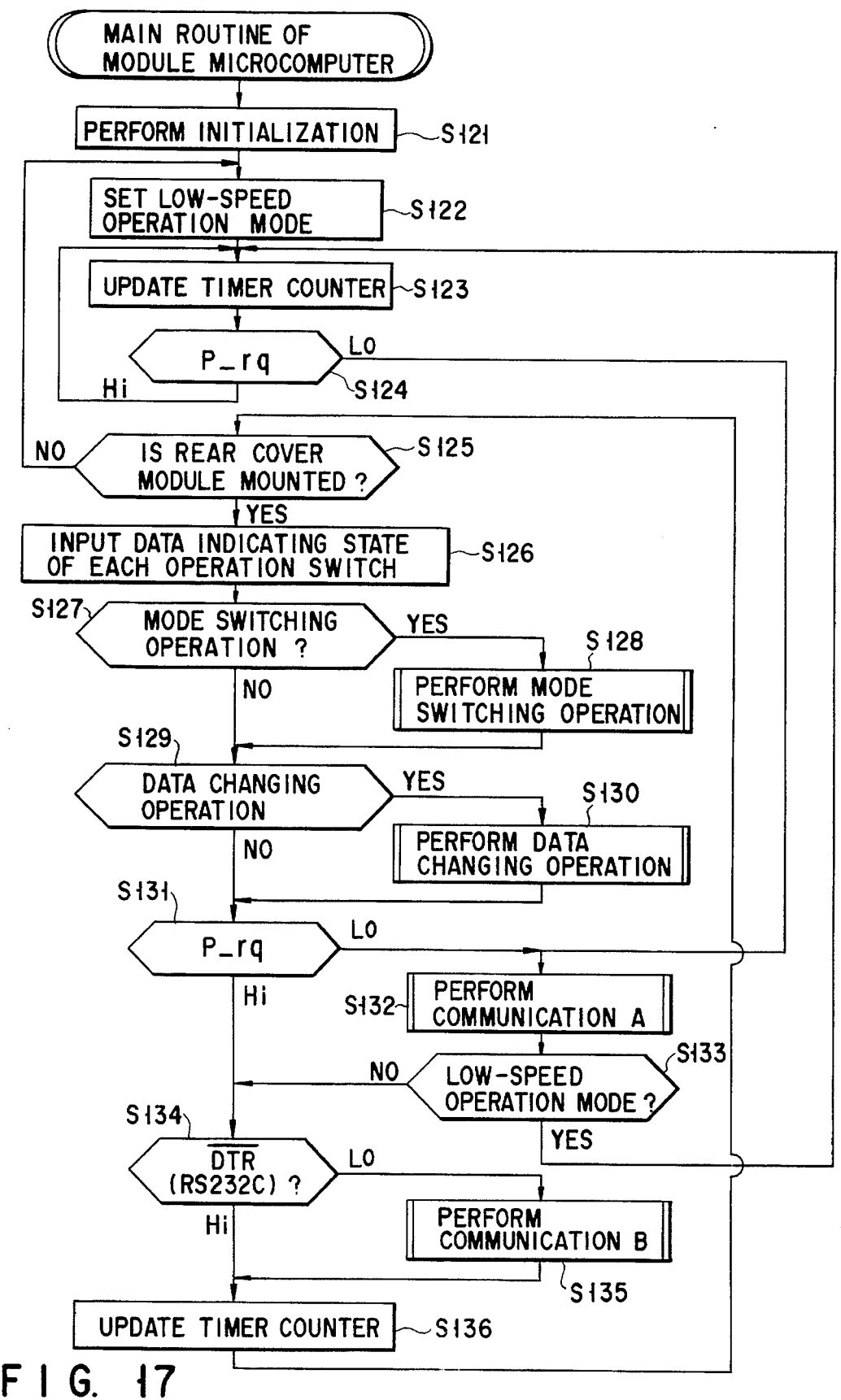
FIG. 17 is a flow chart for explaining the operation of the module microcomputer.

The main routine will be described first with reference to FIG. 17.

When the backup battery 80 is mounted, the module microcomputer 22 is power-on-reset. In step S121, the module microcomputer 22 performs initialization of the I/O port, the memory, and the like. In step S122, the module microcomputer 22 permits only the oscillating operation of the oscillator X1 but inhibits the oscillating operation of the oscillator X2. With this operation, the module microcomputer 22 is set in the low-speed operation mode in which a clock signal generated by the oscillator X1 is used as an operation clock signal. In the low-speed operation mode, the power consumption of the module microcomputer 22 is minimized and can be operated by the backup battery 80.

In step S123, the module microcomputer 22 counts clock signals from the oscillator X1 to prepare data to be imprinted, i.e., "YEAR", "MONTH", "DAY", "HOUR", and "MINUTE" data. In step S124, it is checked whether a communication request is generated by the module microcomputer 22. If NO in step S124, the flow shifts to step S123. In this case, if P_rq changes from high level to low level, the flow advances to step S132 to execute a subroutine "communication A".

In this subroutine, communication between the body microcomputer 12 and the module microcomputer 22 is executed. In step S133, it is checked whether the module microcomputer 22 is set in the low-speed operation mode. If it is determined from the communication that the module microcomputer 22 is set in the low-speed operation mode, the flow shifts to step S123.

When the power switch PW SW is turned off to stop the operation of the body microcomputer 12, the body microcomputer 12 performs B-mode communication. With this communication, the module microcomputer 22 shifts from the high-speed operation mode to the low-speed operation mode. While the body microcomputer 12 is in operation, the flow does not shift from step S133 to step S123. Therefore, the processing loop from step S125 to step S136 is executed during the operation of the body microcomputer 12. The steps in this processing loop will be sequentially described below, starting from the first step.

In step S125, it is checked whether the rear cover module 36 is mounted on the camera body 10. If P__CHB is at low level, it means that the rear cover module 36 is mounted on the camera body 10. In this case, the flow advances to step S126. If P__CHB is at high level, the flow shifts to step S122 to set the low-speed operation mode. This is because the rear cover module 36 cannot receive power from the camera body 10 when the module is separated from the camera body 10.

In step S126 described above, data indicating the state of each operation switch connected to the module microcomputer 22 is input thereto. In step S127, it is checked whether a switch associated with a mode switching operation is operated. If YES in step S127, the flow advances to step S128 to execute a subroutine "mode switching operation".

In step S129, it is checked whether a switch associated with a data changing operation with respect to the EEPROM 24 is operated. If YES in step S129, the flow advances to step S130 to execute a subroutine "data changing operation". In step S131, it is checked whether a communication request is input from the body microcomputer 12. When the body microcomputer 12 outputs a communication request, P__rq changes from high level to low level. If P__rq is at low level, the flow advances to step S132.

If it is determined in step S131 that P__rq is at high level, the flow advances to step S134 to check whether a communication request is input from the outside of the camera. When the personal computer PC outputs a communication request, the signal $\overline{DTR}$ changes from high level to low level. If the signal $\overline{DTR}$ is at low level, the flow advances to step S135 to execute a subroutine "communication B". In step S136, "YEAR", "MONTH", "DAY", "HOUR", and "MINUTE" counters are updated periodically.

Figure 18:
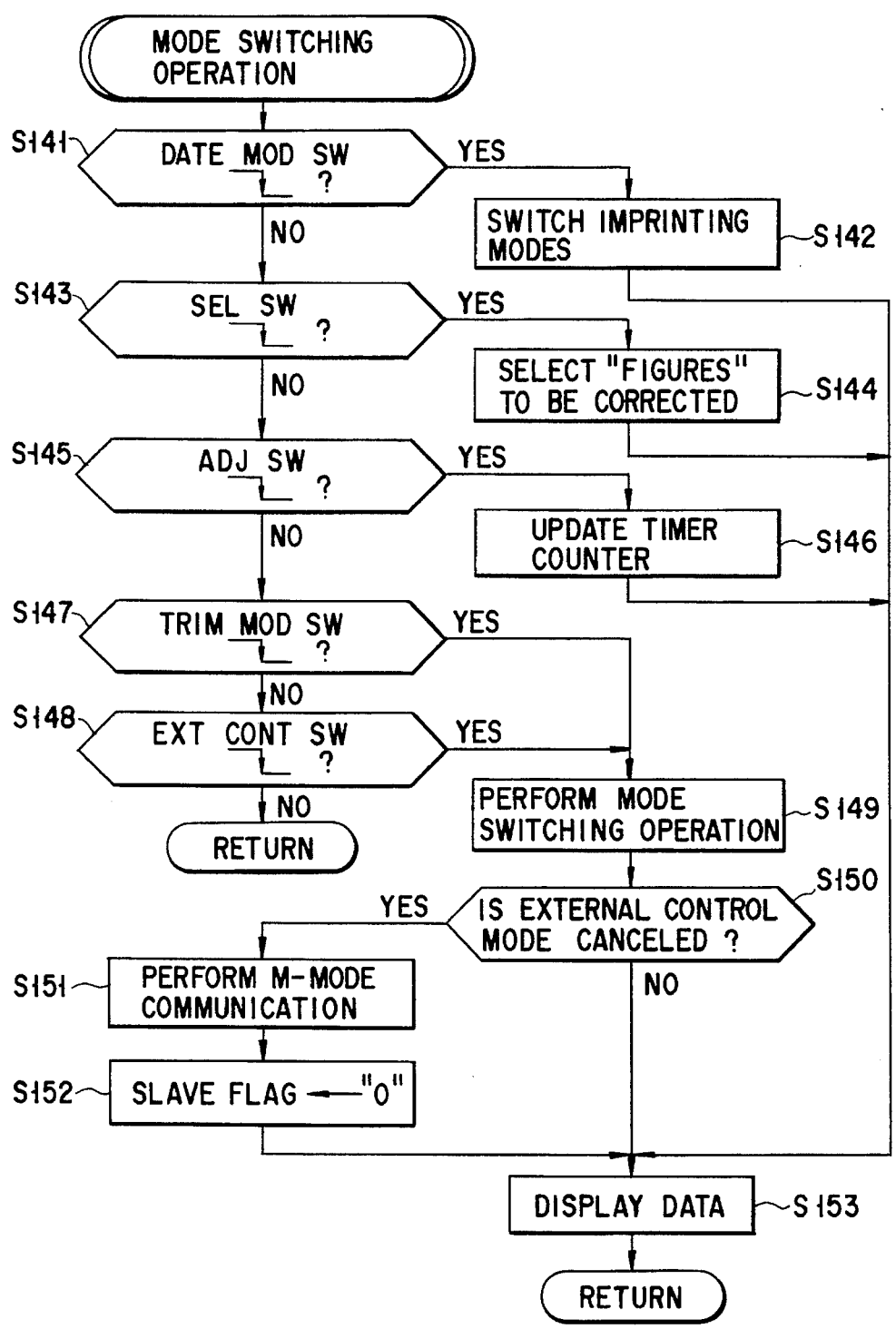
FIG. 18 is a flow chart showing a subroutine for explaining a "mode changing" operation.

The subroutine "mode switching operation" will be described next with reference to FIG. 18.

Figure 24:
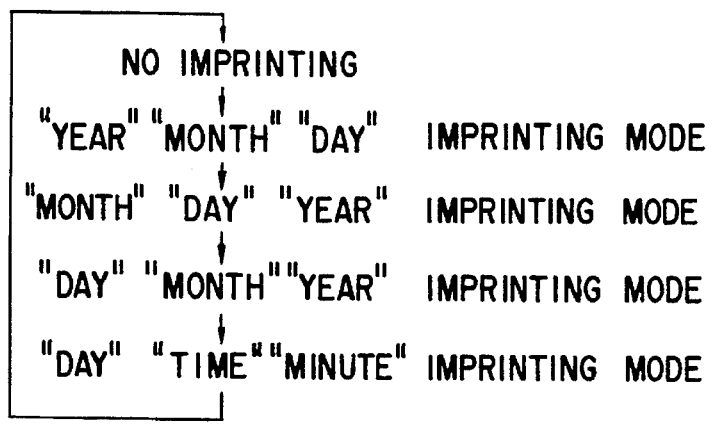
FIG. 24 is a view showing a state in which imprinting modes are switched from each other.
Figure 25:
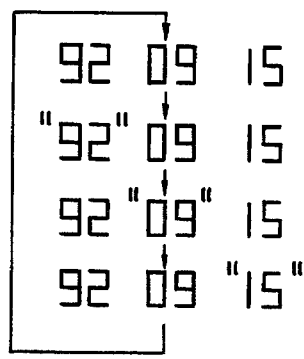
FIG. 25 is a view showing a state in which "figures" to be corrected change.

In step S141, it is checked whether a date mode switch (DATE MOD SW) (not shown) of the operation switches 40 is operated. If YES in step S141, the flow advances to step S142. In step S142, four imprinting modes are available. As shown in FIG. 24, the four modes are sequentially switched every time the date mode switch is operated. The state of the set mode is displayed by the display circuit 56 in step S153. In step S143, it is checked whether a selector switch (SEL SW) is operated. If YES in step S143, the flow advances to step S144 to select "figures" to be corrected. Every time the selector switch is operated, the display is changed, as shown in FIG. 25. Note that the "figures" indicated by the quotation marks (" ") in FIG. 25 are the selected figures. These figures are flickered to inform the user that they are figures to be corrected.

In step S145, it is checked whether an adjuster switch (ADJ SW) is operated. If YES in step S145, the flow advances to step S146. The selected figures are incremented every time the adjuster switch is operated. The set figures are displayed.

Figure 26:
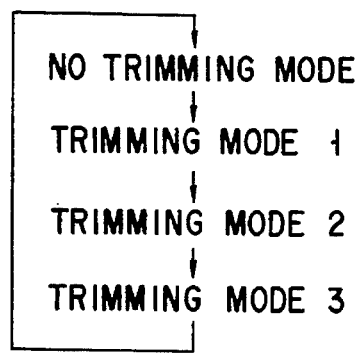
FIG. 26 is a view showing a state in which the trimming modes are switched from each other.

In step S147, it is checked whether a trimming mode switch (TRIM MOD SW) is operated. If YES in step S147, the flow advances to step S149 to switch trimming modes. There are three trimming modes, which are sequentially switched every time the trimming mode switch is operated, as shown in FIG. 26. The set mode is displayed.

The print ranges in the respective trimming modes are shown in FIGS. 14A through 14D, respectively. Each print range must be recorded, as data, on the magnetic track 16. In this case, the data stored in the EEPROM 24 are changed in accordance with each print range. Trimming mode information must be transferred, as mode data, to the body microcomputer 12.

As described above, the mode data is transferred to the body microcomputer 12 by G-mode communication. In this case, the mode data is changed in accordance with the trimming information. In step S148, it is checked whether an external control switch (EXT CONT SW) is operated. By operating this switch, the external control mode can be set or canceled. If the flow advances to step S149, the mode data to be transferred to the body microcomputer 12 is changed.

When the external control mode is canceled upon operation of the external control switch (EXT CONT SW), the flow advances from step S150 to step S151. In step S151, M-mode communication is performed. With this operation, the body microcomputer 12 is released from the slave mode. In step S152, a slave flag is cleared. The slave flag is set in the subroutine "communication A". When the flag is "0", an exposure operation of the camera cannot be executed in accordance with a control signal input from the outside of the camera. In step S153, data corresponding to each selected mode is output to the display circuit 56.

Figure 19:
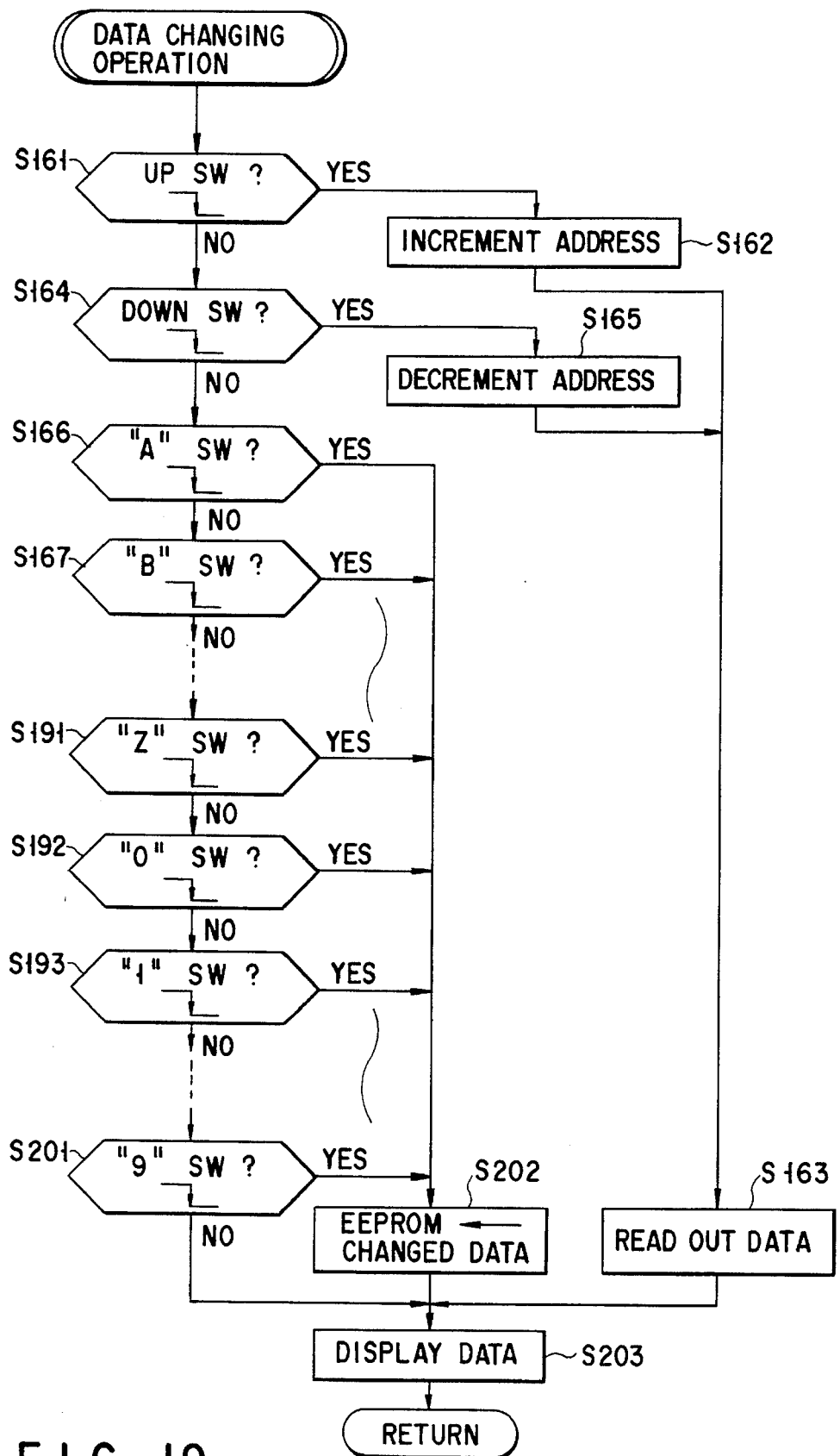
FIG. 19 is a flow chart showing a subroutine for explaining a "data changing" operation.

The subroutine "data changing operation" will be described next with reference to FIG. 19. In this routine, the data stored in the EEPROM 24 can be changed in accordance with the operations of switches. This data is to be recorded on the magnetic track 16 of the film 18.

In step S161, it is checked whether an up switch (UP SW) is operated. If YES in step S161, the flow advances to step S162 to increment an address. In step S163, data, in the EEPROM 24, designated by this address is read out. In step S203, the address and the data are displayed.

If it is determined in step S161 that the UP SW is not in operation, the flow advances to step S164 to check whether a down switch (DOWN SW) is operated. If YES in step S164, the flow advances to step S165 to decrement the address. In steps S163 and S203, data corresponding to the address is displayed. In this case, the user can check the data recorded on the magnetic track 16 by operating the UP SW and the DOWN SW.

In steps S166, S167 . . . , S191, it is checked whether letter switches are operated. Subsequently, in steps S192, S193, . . ., S201, it is checked whether numeral switches are operated. If these letter and numeral switches are operated, the flow advances to step S202 in either case. In step S202, data, in the EEPROM 24, designated by the address is changed.

Data are stored in the EEPROM 24 in accordance with the ASCII codes shown in FIG. 27. According to the flow chart shown in FIG. 19, only letters and numerals can be input. In practice, however, special symbols other than letters and numerals can be input.

Figure 28:
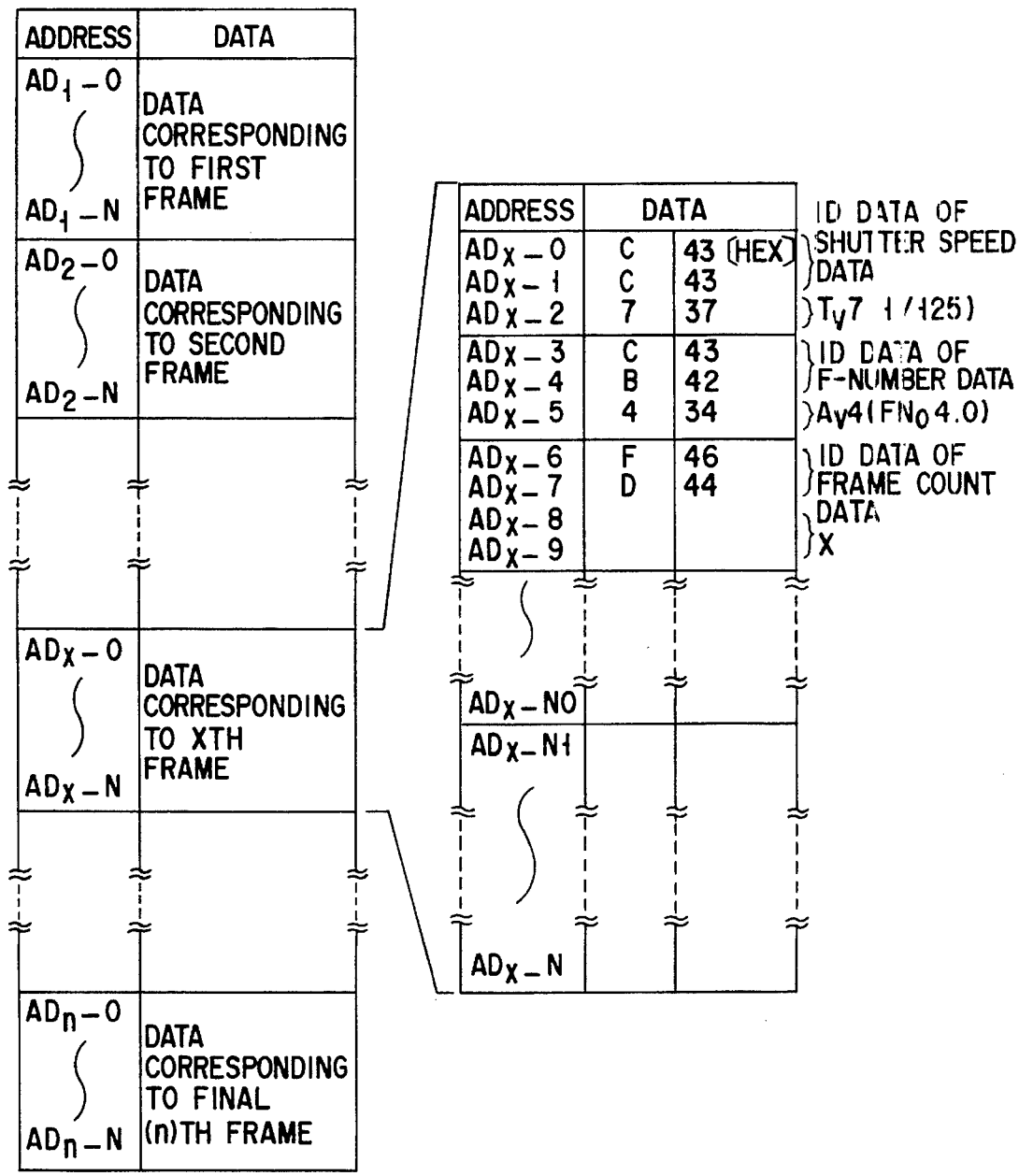
FIG. 28 is a view showing the memory map of an EEPROM.

FIG. 28 shows the memory map of the EEPROM 24. Referring to FIG. 28, data corresponding to the first frame are stored at addresses AD1_0 to AD1_N. Similarly, data are stored at addresses corresponding to the subsequent frames. The map on the right side in FIG. 28 indicates data corresponding to the xth frame. Photographic condition data are stored at addresses ADx_0 to ADx_N0. In a trimming mode, data indicating a trimming range is also stored at the time of printing. Each data has an ID code for identifying the data. For example, such ID codes are disclosed in PCT National Publication No. 4-501016. In the range defined by addresses ADx_$N_1$ to ADx_N, the user stores data, as needed. In this range, therefore, data can be stored in an arbitrary format.

Figure 20A:
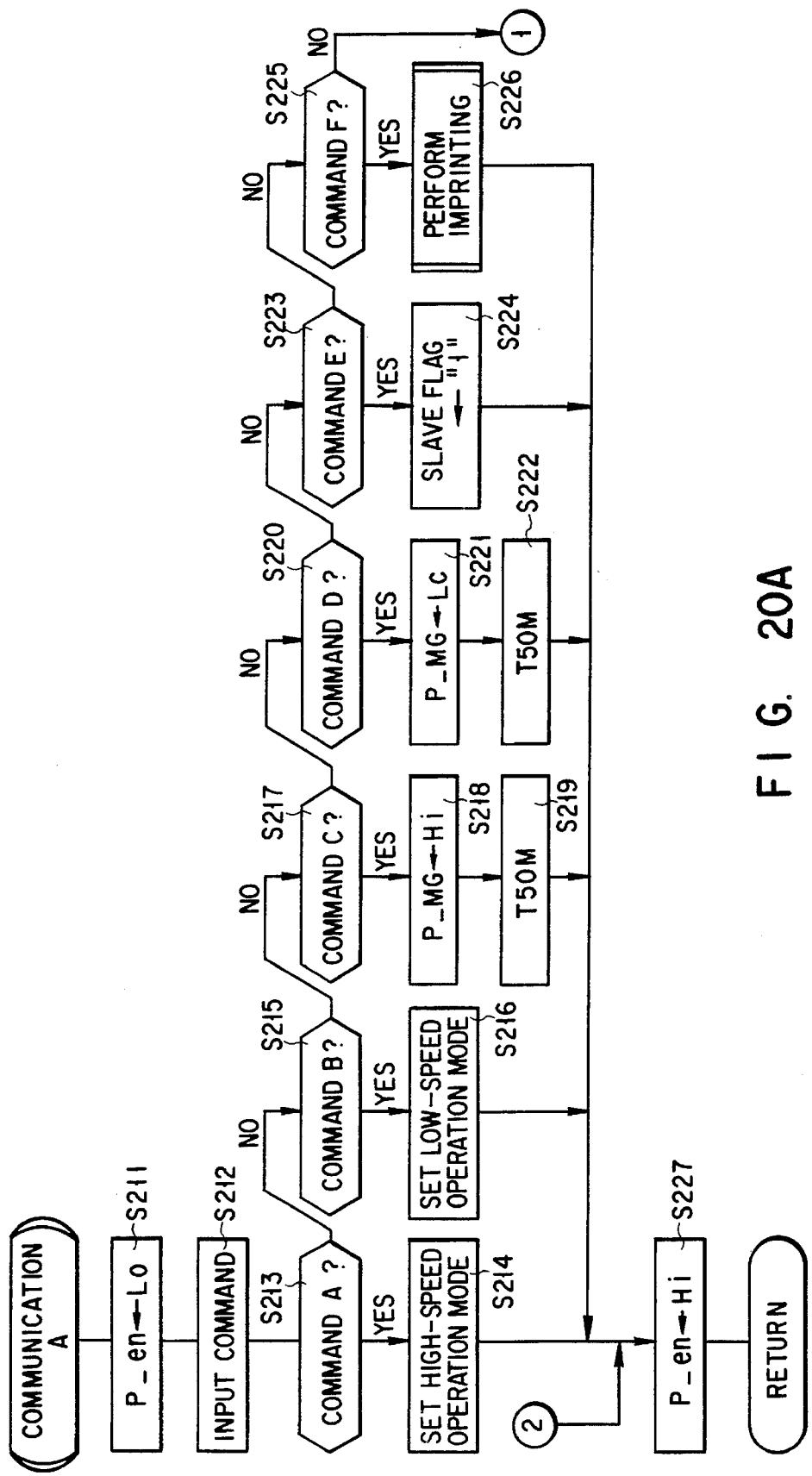
FIGS. 20A and 20B are flow charts showing a subroutine for explaining a "communication A"
Figure 20B:
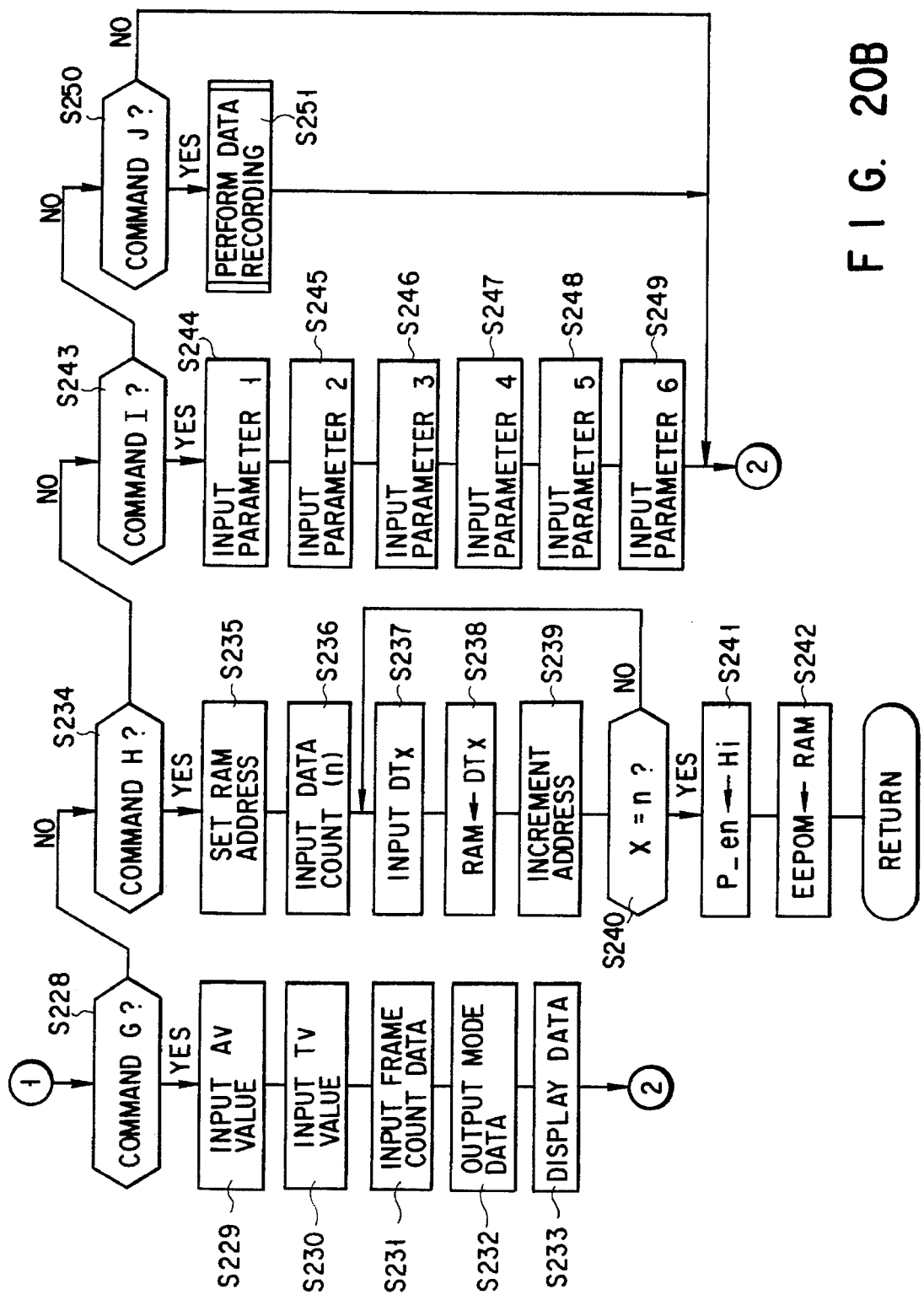

The subroutine "communication A" will be described below with reference to FIGS. 20A and 20B. Upon reception of a communication request from the body microcomputer 12 through P_rq, the module microcomputer 22 calls this subroutine.

In step S211, the module microcomputer 22 changes P_en from high level to low level to permit communication with the body microcomputer 12. In step S212, the module microcomputer 22 receives a command output from the body microcomputer 12. In step S213, the module microcomputer 22 checks whether the command is the command A.

If YES in step S213, the flow advances to step S214 to start the oscillating operation of the oscillator X2. A clock signal generated by the oscillator X2 is used as an operation clock signal for the module microcomputer 22. Thereafter, the flow advances to step S227 to change P_en from low level to high level to terminate the communication.

If it is determined in step S213 that the command is not the command A, the flow advances to step S215 to check whether the command is the command B. If YES in step S215, the flow advances to step S216. In step S216, the oscillating operation of the oscillator X2 is inhibited. Thereafter, a clock signal generated by the oscillator X1 is used as an operation clock signal. The flow then advances to step S227.

When the flow advances from step S215 to step S217, it is determined that the command is the command C. If it is determined that the command is the command C, the flow advances to step S218. In step S218, the module microcomputer 22 changes P_MG from low level to high level. As a result, the transistor Q20 is turned on to supply a current to the solenoid 86. In step S219, the flow waits for 50 msec. The flow then advances to step S227. The wait time in step S219 is the time required for the solenoid 86 to press the magnetic head 28 against the film 18. Note that the wait time of 50 msec is only an example, and the present invention is not limited to this.

When the flow advances from step S217 to step S220, it is checked whether the command is the command D. If it is determined that the command is the command D, the flow advances to step S221. In step S221, the module microcomputer 22 changes P_MG from high level to low level. As a result, the transistor Q20 is turned off to stop supplying the current to the solenoid 86. In step S222, the flow waits for 50 msec. The flow then advances to step S227. The wait time in step S222 is the time required to completely separate the magnetic head 28 from the film 18.

When the flow advances from step S220 to step S223, it is checked whether the command is the command E. If it is determined that the command is the command E, the flow advances to step S224 to set the slave flag. Thereafter, the flow advances to step S227. If the slave flag is "1", a control signal can be input from the outside of the camera. After E-mode communication, the body microcomputer 12 is set in the slave mode.

When the flow advances from step S223 to step S225, it is checked whether the command is the command F. If it is determined that the command is the command F, the flow advances to step S226 to execute a subroutine "imprinting". In this subroutine, date data is imprinted on the film 18.

When the flow advances from step S225 to step S228, it is checked whether the command is the command G. If it is determined that the command is the command G, the flow advances to step S229. In step S229, the module microcomputer 22 receives an f-number Av from the body microcomputer 12. In step S230, the module microcomputer 22 receives a shutter speed Tv. In step S231, the module microcomputer 22 receives frame count data. In step S232, the module microcomputer 22 outputs mode data to the body microcomputer 12. This mode data is set in the subroutine "mode switching operation". After the input data is displayed in step S233, the flow shifts to step S227.

When the flow advances from step S228 to step 234, it is checked whether the command is the command H. If it is determined that the command is the command H, the flow advances to step S235 to set addresses of the RAM at which data from the body microcomputer 12 are temporarily stored. In step S236, the module microcomputer 22 receives a data count (n) from the body microcomputer 12. In steps S237 to S240, the data from the body microcomputer 12 are sequentially stored in the RAM. When the n data are input, the flow advances from step S240 to step S241.

In step S241, the module microcomputer 22 changes P_en from low level to high level to terminate the communication. In step S242, the data stored in the RAM are written in the EEPROM 24. The reason why data are written in the EEPROM 24 after they are stored, as a backup copy, in the RAM will be described below.

In most EEPROMs, a storage operation is executed in units of bytes or words. Assume that 64-byte data must be stored per frame. In this case, the time required to store data in the EEPROM is about 5 msec. Therefore, in order to store 64-byte data, 340 msec are required.

When a storage operation is executed during H-mode communication, the communication time is prolonged greatly. Since the body microcomputer 12 performs H-mode communication immediately before an exposure operation, a shorter communication time is better. For the above-described reason, the module microcomputer 22 temporarily stores data from the body microcomputer 12, as a backup copy, in the RAM. While the body microcomputer 12 is executing an exposure operation, the module microcomputer 22 stores the data in the EEPROM 24.

If the amount of data increases, all the data cannot be stored during the exposure operation, and the storage operation needs to be continued during a film rewind operation. However, the module microcomputer 22 performs a date data imprinting operation with respect to the film 18 during a film rewind operation. It is, therefore, difficult to continue the storage operation. One of the recently developed EEPROMs is capable of performing a storage operation several hundreds bytes at a time (NIKKEI ELECTRONICS 1992. 2. 17 PP. 169–186). The use of such a storage element will solve the above-described problem.

When the flow advances from step S234 to step S243, it is checked whether the command is the command I. If it is determined that the command is the command I, the flow advances to step S244. In steps S244 to S249, the module microcomputer 22 receives six parameters from the body microcomputer 12. Thereafter, the flow shifts to step S227.

When the flow advances from step S243 to step S250, it is checked whether the command is the command J. If it is determined that the command is the command J, the flow advances to step S251 to execute a subroutine "data recording". In this subroutine, the data stored in the EEPROM 24 are recorded on the magnetic track 16.

The subroutine "data recording" will be described below with reference to FIG. 21.

In step S261, the module microcomputer 22 receives the frame count (n) output from the body microcomputer 12. In step S262, the module microcomputer 22 sets ADn_N in a register ADRS. In this case, ADn_N is the bottom address of an area, in the EEPROM 24, in which data are stored. The data are sequentially recorded from the bottom address to the start address.

In step S263, the module microcomputer 22 sets P_DTEN from high level to low level. With this operation, the transistor Q1 is turned on to supply a current to the magnetic head 28. In step S264, P_DT is changed from high level to low level. The magnetic member is then magnetized in a predetermined direction by a magnetic field generated by the magnetic head 28. In step S265, the module microcomputer 22 receives a recording operation start signal (indicated by "*" in FIG. 8E) through P_dA. Thereafter, the step advances to step S266.

In step S266, the module microcomputer 22 reads out data from the EEPROM 24 at an address designated by the register ADRS. In step S267, the value of the register ADRS is decremented. In step S268, the data are output bit by bit from P_DT to be recorded on the magnetic track 16.

In step S269, it is checked whether one-frame data is recorded. If NO in step S269, the flow returns to step S266. When the flow advances from step S269 to step S270, it is checked whether the value of the register ADRS is start address $AD_1\_0$. If NO in step S270, the flow shifts to step S265 to wait until a recording operation start signal is input. If YES in step S270, the flow advances to step S271 to change P_OTEN from low level to high level. With this operation, the transistor Q1 is turned off to stop supplying the current to the magnetic head 28.

A data recording operation will be described below with reference to the timing charts shown in FIGS. 29A, 29B, and 30.

When data is to be recorded on the magnetic track 16, three parameters are required. The three parameters are transferred from the body microcomputer 12 (I-mode communication). The number of reference clock signals (pulses input through P_pi) for determining the length of data is set in parameter 1. Therefore, the value of T is determined by a clock frequency and the value of parameter 1. "1" or "0" of binary data can be determined on the basis of the difference between $T_1$ and $T_0$. The numbers of reference clock signals for determining $T_1$ and $T_O$ are respectively set in parameters 2 and parameters 3.

The following are the parameters corresponding to FIG. 29A:

parameter 1=07 [HEX], parameter 2=05 [HEX] parameter 3=02 [HEX]

The minimum value which can be set in parameter 1 is 03 [HEX]. If a value smaller than this minimum value is set in parameter 1, values which allow discrimination of "1" and "0" cannot be set in parameters 2 and 3.

The waveforms shown in FIG. 29B are obtained by inverting the waveforms shown in FIG. 29A, but the data indicated by the waveforms in FIGS. 29A and 29B have the same meanings. By changing the three parameters, the recording density and the recording waveform can be arbitrarily changed. Therefore, by changing the parameters in accordance with signal density data generated by the photointerrupter 70, the module can be used by various cameras.

The timing chart shown in FIG. 30 will be described next. When the body microcomputer 12 starts to rewind the film 18, a pulse signal is input to P_pi. P_DTEN is changed from high level to low level to allow energization of the magnetic head 28. In accordance with the state of P_DT, a current large enough to saturate a magnetic member flows in the magnetic head 28. The saturation value of N (or S) of magnetization corresponds to high level of P_DT, whereas the saturation value of S (or N) of magnetization corresponds to low level of P_DT. Each signal indicated by a symbol "*" on P_dl is a recording operation start signal from the body microcomputer 12. Upon reception of this signal, the module microcomputer 22 outputs data from P_DT. In order to obtain the recording waveform indicated by the timing chart, the parameters may be set as follows:

parameter 1=03 [HEX], parameter 2=02 [HEX] parameter 3=01 [HEX]

Figure 22:
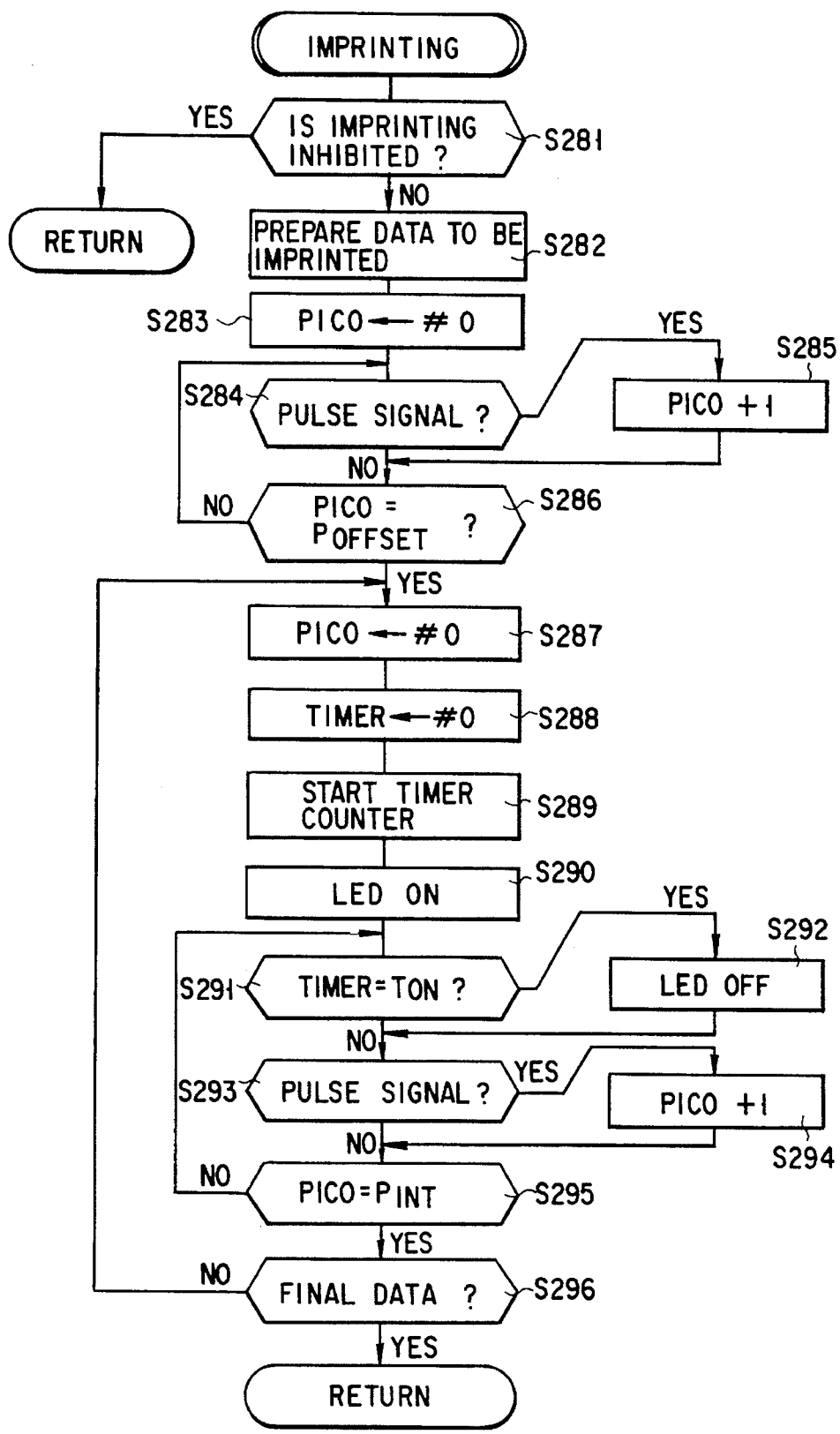
FIG. 22 is a flow chart showing a subroutine for explaining an "imprinting" operation.

The subroutine "imprinting" will be described next with reference to FIG. 22.

In step S281, it is checked whether an imprinting mode is selected. As described above, there are four imprinting modes. If none of the modes is selected, the flow returns to the main routine. In step S282, data to be imprinted is prepared in accordance with the selected mode. In step S283, the register PICO is cleared. The register PICO is used to count pulses input to P_pi.

In step S284, it is checked whether a pulse signal is input. If YES in step S284, the flow advances to step S285 to increment the value of the register PICO. In step S286, it is checked whether the value of the register PICO is equal to $P_{OFFSET}$. $P_{OFFSET}$ is parameter 4 to be transferred from body microcomputer 12. With the processing in steps S284 to S286 described above, emission of the imprinting LEDs is inhibited until the value of the register PICO reaches $P_{OFFSET}$.

In step S287, the register PICO is cleared. After the timer counter is cleared in step S288, the count operation of the timer counter is started in step S289. This timer counter determines the emission timing of the LEDs. In step S290, the data prepared in step S282 are output to P_A, P_B . . . , P_G, and P_DP. With this operation, predetermined segments emit light.

In step S291, it is checked whether the value of the timer counter is equal to TON. TON is parameter 6 to be transferred from body microcomputer 12. TON is set by the body microcomputer 12 in accordance with a film speed. If YES in step S291, the flow advances to step S292. In step S292, P_A, P_B, . . . , P_G, and P_DP are all set at low level. With this operation, the LEDs are turned off.

When the flow advances from step S291 to step S293, it is checked whether a pulse signal is input. If YES in step S293, the flow advances to step S294 to increment the value of the register PICO. In step S295, it is checked whether the value of the register PICO is equal to $P_{INT}$. $P_{INT}$ is parameter 5 transferred from the body microcomputer 12.

If the value of the register PICO is not equal to PINT, the flow advances to step S291. In contrast to this, if the value of the register PICO is equal to PINT, the flow advances to step S296. In step S296, it is checked whether all the data are imprinted. If NO in step S297, the flow shifts to step S287 to imprint the next data.

FIG. 31 is a timing chart representing the operation of this subroutine. The start position of the data imprinted on the film 18 can be determined by $P_{OFFSET}$. The intervals between the numerals imprinted on the film 18 can be determined by $P_{INT}$. Note that TON is determined in consideration of the moving speed of the film 18 and its film speed.

Figure 23:
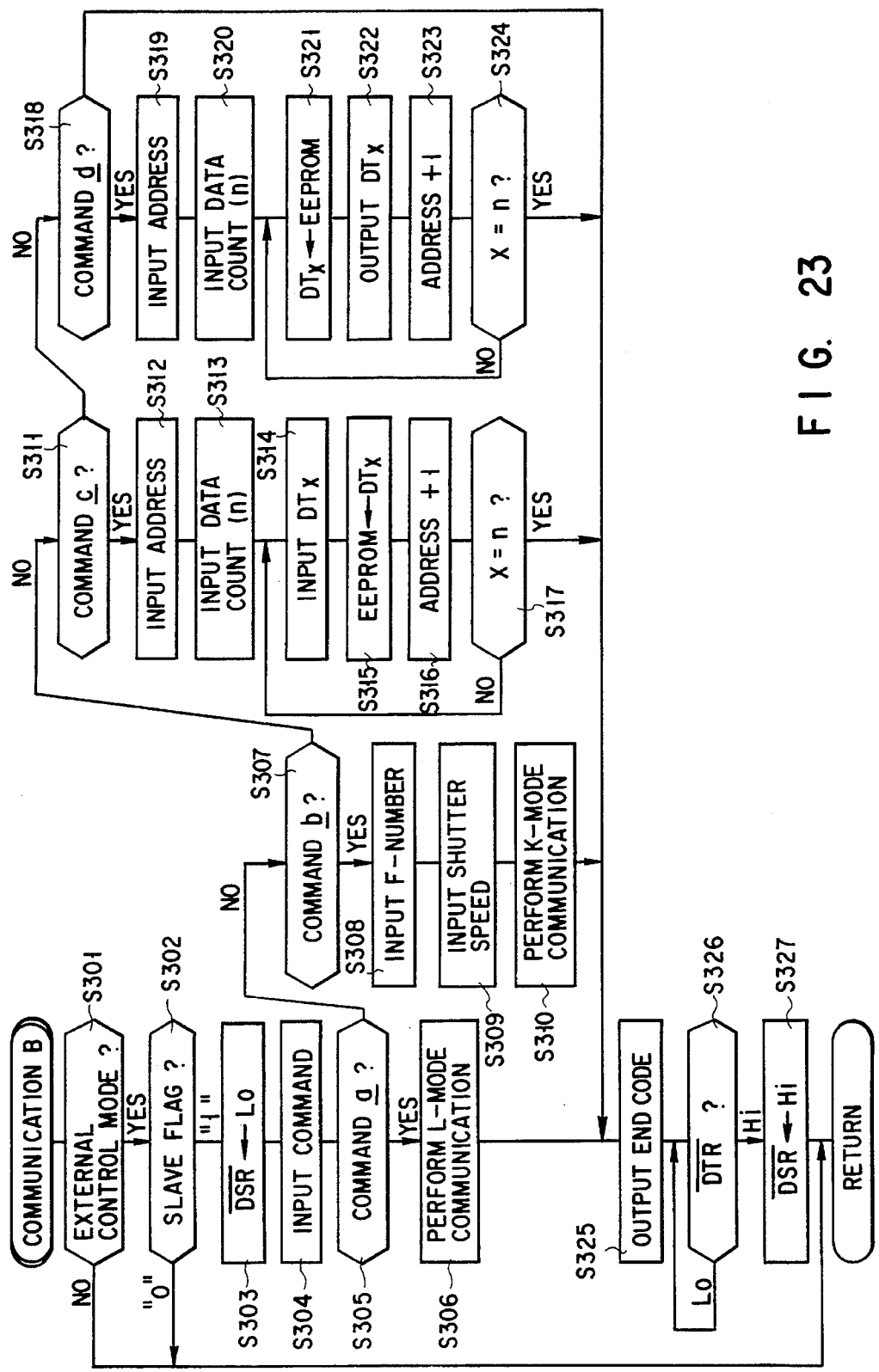
FIG. 23 is a flow chart showing a subroutine for explaining a "communication B"

A subroutine "communication B" will be described next with reference to FIG. 23.

When a communication request from the personal computer PC is output to the RS232C, this subroutine is called. In step S301, it is checked whether the module microcomputer 22 is set in the external control mode. If NO in step S301, the flow returns to the main routine. If YES in step S301, the flow advances to step S302 to check the state of the slave flag. If the slave flag is "0", the flow returns to the main routine. This is because when the flag is "0", the body microcomputer 12 cannot be controlled by the module microcomputer 22. If it is determined in step S302 that the flag is "1", the flow advances to step S303.

In step S303, the module microcomputer 22 changes the signal DSR from high level to low level to permit communication with the personal computer PC. In step S304, the module microcomputer 22 receives a command from the personal computer PC.

In step S305, it is checked whether the command is the command a. If YES in step S305, the flow advances to step S306 to perform L-mode communication. With this operation, the body microcomputer 12 executes an automatic exposure operation. In step S325, an end code is output to the personal computer PC. In step S326, the flow waits until the communication lines of the personal computer PC are closed. When the signal DTR changes from low level to high level, the flow advances to step S327 to change the signal DTR from low level to high level, thus terminating the communicating operation.

When the flow advances from step S305 to step S307, it is checked whether the command is the command b. If YES in step S307, the flow advances to step S308. In steps S308 and S309, the module microcomputer 22 receives f-number and shutter speed data. In step S310, K-mode communication is performed. The f-number and shutter speed data from the personal computer PC are transferred to the body microcomputer 12. The body microcomputer 12 then executes an exposure operation on the basis of the two data. After the K-mode communication is completed, the flow advances to step S325.

When the flow advances from step S307 to step S311, it is checked whether the command is the command c. If it is determined that the command is the command c, the flow advances to step S312 to receive address data of the EEPROM 24. In step S313, the module microcomputer 22 receives a data count (n) indicating the number of data to be stored in the EEPROM 24. In steps S314 to S317, data transferred from the personal computer PC are sequentially stored in the EEPROM 24. When n data are stored in the EEPROM 24, the flow advances from step S317 to step S325.

When the flow advances from step S311 to step S318, it is checked whether the command is the command d. If it is determined that the command is the command d, the flow advances to step S319 to receive address data of the EEPROM 24. In step S320, the module microcomputer 22 receives a data count (n) indicating the number of data to be read out from the EEPROM 24. In steps S321 to S324, data are read out from the EEPROM 24, and the data are output to the personal computer PC in the read order. When n data are output, the flow advances from step S324 to step S325.

In this manner, by performing communication in the a or b mode, a photographic operation can be performed without touching the camera. The data stored in the EEPROM are recorded on the magnetic track of the film in synchronism with a film rewind operation. Therefore, before the execution of a film rewind operation, the data can be arbitrarily changed by using c- and d-mode communication.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A camera system comprising:
 a camera body including:
  a first microcomputer incorporated in said camera body, said microcomputer being capable of transmitting data to the outside of said camera body, and
  a film feed mechanism controlled by said first microcomputer to feed a film loaded in said camera body; and
 a rear cover module completely detachable with respect to said camera body and including:
  a second microcomputer incorporated in said rear cover module,
  a storage unit for storing the data, transmitted from said first microcomputer, in accordance with a control command from said second microcomputer,
  a magnetic head for magnetically recording data on a magnetic recording portion formed on the film, and
  a magnetic recording circuit for reading out the data stored in said storage unit in accordance with a control signal from said second microcomputer, and recording the data on the magnetic recording portion,
 wherein said first microcomputer is prohibited from transmitting data to said rear cover module when said first microcomputer detects that said rear cover module is not engaged with said camera body.

2. A system according to claim 1, wherein said storage unit comprise a nonvolatile memory, and said second microcomputer causes said magnetic recording circuit to perform a recording operation while the film is rewound by said film feed mechanism.

3. A system according to claim 1, wherein said first microcomputer transmits data to said storage unit every time exposure is performed with respect to one frame of the film.

4. A system according to claim 1, wherein said rear cover comprises data imprinting means for imprinting data on the film.

5. A system according to claim 1, wherein said rear cover module further comprises a setting unit for setting a trimming mode, and said second microcomputer causes said magnetic head to magnetically record trimming information set by said setting unit.

6. A system according to claim 1, wherein said rear cover module comprises a communication circuit for communicating data with an external unit.

7. A system according to claim 6, wherein said external unit has a personal computer, and said rear cover module comprises means for rewriting data stored in said storage unit through said communication circuit.

8. A camera system comprising:

a camera body having camera-side connector means for externally transmitting data, a module device having module-side connector means, mounted on said camera body in a completely detachable manner, for receiving external data, said camera body including:
 film feed means for feeding a film loaded in said camera body,
 film movement signal generating means for generating a pulse signal in accordance with movement of the film driven by said film feed means, and
 means for outputting data associated with control of said camera body through said camera-side connector means, and said module device including:
 magnetic head means for performing a magnetic recording operation with respect to a magnetic recording portion on the film,
 control means for causing said magnetic head means to record the data received through said connector means on the magnetic recording portion at a timing corresponding to the pulse signal, and
 a communication circuit for receiving data from an external unit, said communication circuit including:
 two control line terminals for controlling the timing at which data is sent and timing at which data is received,
 a line terminal for serially sending data, and
 a line terminal for serially receiving data.

9. A system according to claim 8, wherein said module device records the data received through said communication circuit on the magnetic recording portion.

10. A module device capable of externally transmitting data and detachable with respect to a camera body, comprising:
 control means for receiving the data from said camera body and performing sequence control of said module device;
 magnetic head means for recording the data on a magnetic recording portion on a film loaded in said camera body in accordance with a control signal from said control means,
 nonvolatile storage means for temporarily storing the data transmitted from said camera body, and
 a communication circuit for performing communication with an external unit, said communication circuit including:
 two control line terminals for controlling the timing at which data is sent and timing at which data is received,
 a line terminal for serially sending data, and
 a line terminal for serially receiving data.

11. A device according to claim 10, further comprising data imprinting means for optically imprinting data on the film.

12. A device according to claim 10, further comprising a magnetic head driving unit for pressing/separating said magnetic head against/from the film.

13. A device according to claim 12, wherein said magnetic head driving unit comprises a solenoid.

* * * * *